United States Patent
Mizumoto et al.

(10) Patent No.: US 7,664,346 B2
(45) Date of Patent: Feb. 16, 2010

(54) WAVEGUIDE-TYPE BROADBAND OPTICAL ISOLATOR

(75) Inventors: Tetsuya Mizumoto, Tokyo (JP); Yuya Shoji, Tokyo (JP)

(73) Assignee: Mitsumi Electric Co., Ltd., Tama-Shi (JP)

(*) Notice: Subject to any disclaimer, the term of this patent is extended or adjusted under 35 U.S.C. 154(b) by 0 days.

(21) Appl. No.: 12/087,950

(22) PCT Filed: Oct. 10, 2006

(86) PCT No.: PCT/JP2006/320521

§ 371 (c)(1),
(2), (4) Date: Aug. 19, 2008

(87) PCT Pub. No.: WO2007/083419

PCT Pub. Date: Jul. 26, 2007

(65) Prior Publication Data

US 2009/0003757 A1 Jan. 1, 2009

(30) Foreign Application Priority Data

Jan. 19, 2006 (JP) ............................. 2006-011234

(51) Int. Cl.
*G02B 6/00* (2006.01)
(52) U.S. Cl. ........................................................ 385/11
(58) Field of Classification Search .................. 385/11; 372/703
See application file for complete search history.

(56) References Cited

U.S. PATENT DOCUMENTS 7,260,281 B2 * 8/2007 Salib et al. .................... 385/11

| | | |
|---|---|---|
| 2005/0089258 A1 | 4/2005 | Kim et al. |
| 2005/0094923 A1 | 5/2005 | Kim et al. |
| 2009/0003757 A1* | 1/2009 | Mizumoto et al. ............. 385/3 |

FOREIGN PATENT DOCUMENTS

| | | |
|---|---|---|
| JP | 05-134221 A | 5/1993 |
| JP | 2000-292742 A | 10/2000 |
| JP | 2001-350039 | * 12/2001 |
| JP | 2003-241141 A | 8/2003 |
| JP | 2003-302603 A | 10/2003 |
| JP | 2005-122169 A | 5/2005 |
| JP | 2005-128531 A | 5/2005 |

OTHER PUBLICATIONS

Applied Optics, vol. 39, No. 33, Nov. 2000; Demonstration of an Optical Isolator With a Semiconductor Guiding Layer That Was Obtained by Use of a Nonreciprocal Phase Shift; H. Yokoi et al; pp. 6158-6164.

(Continued)

*Primary Examiner*—Uyen-Chau N Le
*Assistant Examiner*—Kajli Prince
(74) *Attorney, Agent, or Firm*—Frishauf, Holtz, Goodman & Chick, P.C.

(57) ABSTRACT

A waveguide-type broadband optical isolator according to the present invention, comprising: a reciprocal phase shifter which makes a phase difference $3\pi/2$ between a first light wave propagating through a first waveguide and a second light wave propagating through a second waveguide, with a fundamental operating wavelength $\lambda$, and a nonreciprocal phase shifter which provides a phase difference $\pi/2$ for forward propagating waves and a phase difference $-\pi/2$ for backward propagating waves.

8 Claims, 14 Drawing Sheets

OTHER PUBLICATIONS

IEEE Transactions of Magnetics; vol. 29, No. 6, Nov. 1993; T. Mizumoto et al; In-Plane Magnetized Rare Earth Iron Garnet for a Waveguide Optical Isolator.

IEEE Transactions on Microwave Theory; June 1982; vol. MTT-30; T. Mizumoto et al; Nonreciprocal Propagation Characteristics of YIG Thin Film; pp. 922-925.

* cited by examiner

FIG.1
Prior Art

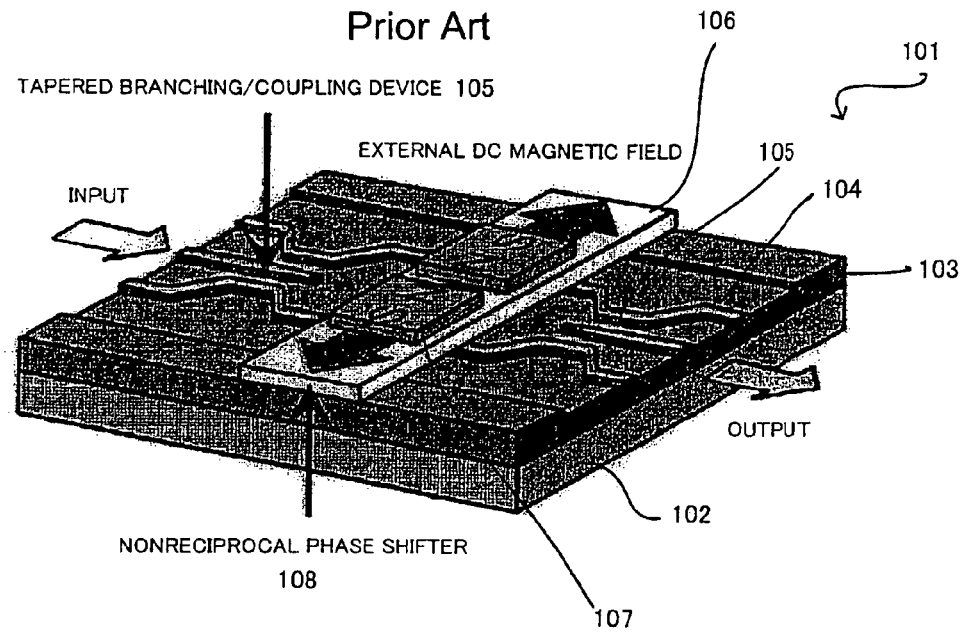

TAPERED BRANCHING/COUPLING DEVICE 105
EXTERNAL DC MAGNETIC FIELD
INPUT
NONRECIPROCAL PHASE SHIFTER 108
OUTPUT

FIG.2A
Prior Art

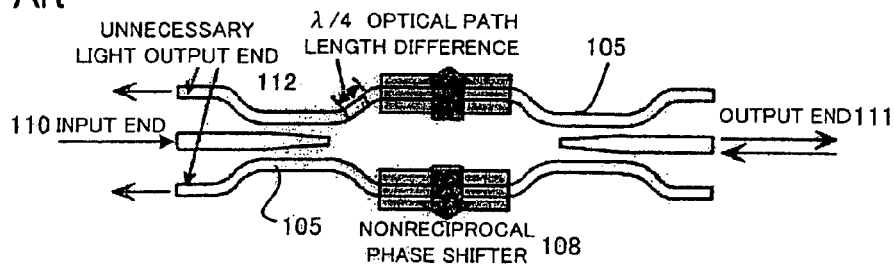

UNNECESSARY LIGHT OUTPUT END
$\lambda/4$ OPTICAL PATH LENGTH DIFFERENCE
110 INPUT END
OUTPUT END 111
NONRECIPROCAL PHASE SHIFTER 108

FIG.2B
Prior Art

FORWARD WAVE (IN-PHASE INTERFERENCE)
PHASE DIFFERENCE= $\pi/2$(OPTICAL PATH DIFFERENCE)− $\pi/2$(NONRECIPROCAL)=0

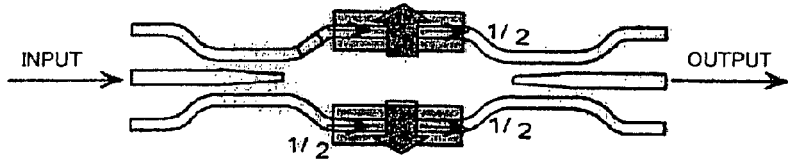

INPUT
OUTPUT

FIG.2C
Prior Art

BACKWARD WAVE (OPPOSITE-PHASE INTERFERENCE)
PHASE DIFFERENCE= $\pi/2$(OPTICAL PATH DIFFERENCE)+ $\pi/2$(NONRECIPROCAL)= $\pi$

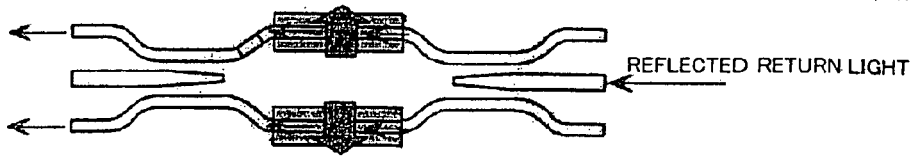

REFLECTED RETURN LIGHT

FIG.7A  FORWARD WAVE (IN-PHASE INTERFERENCE)
PHASE DIFFERENCE=3π/2(OPTICAL PATH DIFFERENCE)+π/2(NONRECIPROCAL)=2π
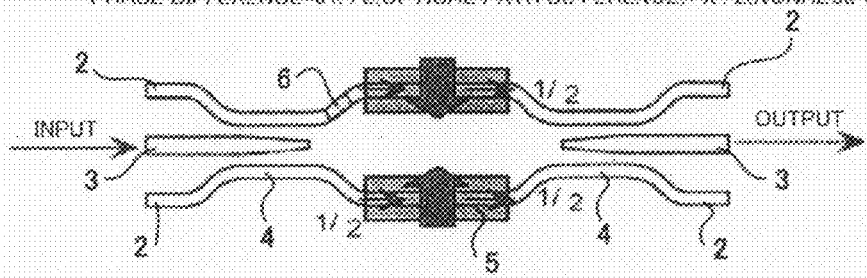
FIG.7B  BACKWARD WAVE (OPPOSITE-PHASE INTERFERENCE)
PHASE DIFFERENCE=3π/2(OPTICAL PATH DIFFERENCE)−π/2(NONRECIPROCAL)=π
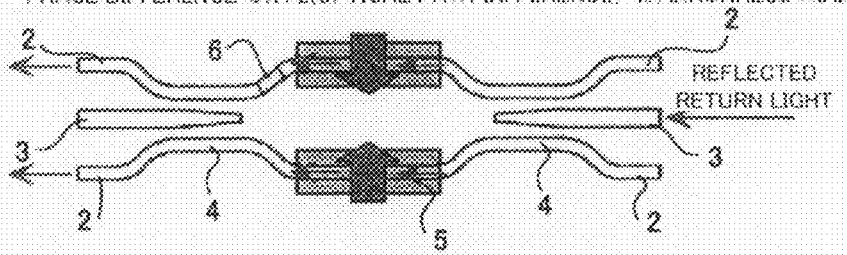
FIG.8A
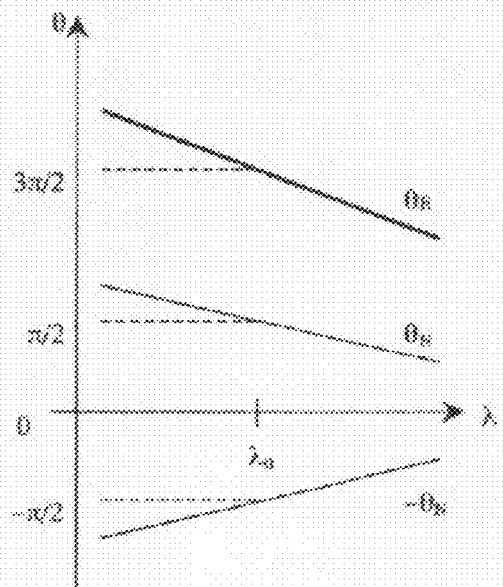
FIG.8B
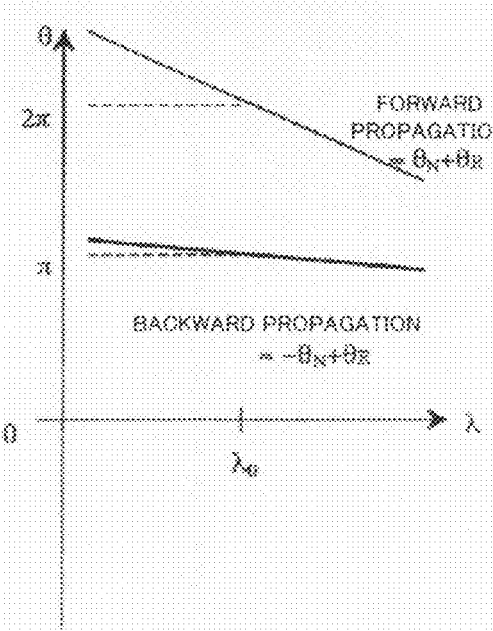

WAVEGUIDE-TYPE BROADBAND OPTICAL ISOLATOR

This application is a U.S. National Phase Application under 35 USC 371 of International Application PCT/JP2006/320521 filed Oct. 10, 2006.

TECHNICAL FIELD

The present invention relates to a waveguide-type broadband optical isolator, and in particular to a waveguide-type broadband optical isolator which has a remarkably broadened a wavelength range within which it operates with desired characteristics satisfied, and operates also on two wavelengths of a 1.31-μm band and a 1.55-μm band used in a long-distance optical fiber communication.

BACKGROUND ART

An optical isolator is a device which allows a light to pass through it in one direction only and blocks the light which attempts to propagate in the opposite direction. For example, by arranging an optical isolator on an exit end of a semiconductor laser, a light emitted from the semiconductor laser passes through the optical isolator and can be used as a light source for an optical fiber communication. Conversely, a light which attempts to be incident on the semiconductor laser through the optical isolator is blocked by the optical isolator and cannot be incident on the semiconductor laser. If the optical isolator is not placed on the exit end of the semiconductor laser, a reflected return light is incident on the semiconductor laser and degrades the oscillation characteristics of the semiconductor laser. In other words, the optical isolator has a function of both blocking the light which attempts to be incident on the semiconductor laser and maintaining a stable oscillation without degrading the characteristics of the semiconductor laser.

Not only in the above-described semiconductor laser, but also in optical active devices such as an optical amplifier, the incidence of an unintentional backward light degrades the operation characteristics of the device and may also cause some unintentional behavior. Since the optical isolator allows the light to pass through in one direction only, a backward light can be prevented from an unintentional incidence to the optical active device.

Conventionally, an interference-type optical isolator (a waveguide-type optical isolator), as shown in FIG. 1, has been proposed as an optical isolator suitable for integration with a semiconductor laser. This conventional optical isolator 101 comprises a waveguide layer 103 made of a semiconductor material on a compound semiconductor substrate 102, a waveguide 104 and tapered branching/coupling devices 105 on the waveguide layer 103. A clad layer 106 made of a magneto-optical material is formed on the waveguide layer 103, and a magnetic field applying means 107 for orienting the magnetization of the magneto-optical material to a predetermined direction is provided on the clad layer 106.

The above optical isolator (hereinafter referred to as a "waveguide-type optical isolator") 101 is configured by employing a phase change (hereinafter referred to as the "nonreciprocal phase shift effect") of a light wave with different magnitudes depending on a propagation direction occurring within two optical waveguides constituting an optical interferometer, so that light waves propagating through two optical waveguides have the same phase for forward propagating waves and are in phase opposition for backward propagating waves.

The operating principle of the waveguide-type optical isolator 101 is shown in FIGS. 2A to 2C. When the two light waves are in-phase, they are output from a central output end 111 in the tapered branching/coupling devices 105 provided on the output side of the waveguide-type optical isolator 101 due to the symmetry of the structure (FIG. 2B). On the other hand, when they are in phase opposition, the light waves that are input from the central output terminal (reflected return light) will form an anti-symmetric distribution at the tapered branching/coupling devices 105 provided on the input side of the waveguide-type optical isolator 101 (on the left side of the figure) due to the symmetry of the structure, and thus, the light waves will be outputted from an unnecessary light output terminals 112 provided on both sides of the central output terminal 110 instead of being output from the central output terminal (input terminal) 110 of the tapered branching/coupling devices 105 (shown in FIG. 2C). In other words, the light waves entered from the input end 110 of the left-side tapered branching/coupling device 105 are output from the output end 111 of the right-side tapered branching/coupling device 105, while the lights entered from the output end 111 of the tapered branching/coupling devices 105 do not return to the input end 110 of the left-side tapered branching/coupling device 105, thereby to allow the input end 110 to be isolated from the backward propagating waves.

The above-described operation is achieved by the structure shown in FIG. 2C. First, by making one of the interference optical paths longer than the other, a phase difference (a reciprocal phase difference) that is independent on a propagation direction is generated between two optical paths. A material (hereinafter referred to as a "magneto-optical material") having a magneto-optical effect is arranged in the planar optical waveguide, and a magnetic field is applied externally to a direction (lateral direction) perpendicular to the propagation direction within the plane of the waveguide in order to orient the magnetization of the magneto-optical material, thereby to generate the nonreciprocal phase shift effect. On the basis of the relationship between the propagation direction of the light and the orientation of the magnetization, the nonreciprocal phase shift effect caused by the magneto-optical effect is determined. When the propagation direction is reversed with the magnetization direction maintained, the nonreciprocal phase shift effect is changed. Hereinafter, the difference in the nonreciprocal phase shift effect between the forward propagating waves and the backward propagating waves is referred to as the "nonreciprocal phase shift amount".

In the waveguide-type optical isolator 101 shown in FIGS. 2A to 2C, since the magnetic field is applied to the two waveguides constituting the interferometer in an anti-parallel manner, the phase difference of the light waves when they have propagated through the two waveguides by the same distance coincides with the nonreciprocal phase shift amount. When a phase difference +φ is generated between the two waveguides for the forward propagating waves by the nonreciprocal phase shift effect, a phase difference −φ with the opposite sign is generated for the backward propagating waves.

In addition to the nonreciprocal phase shift effect caused by the magneto-optical effect, the two waveguides constituting the interferometer are designed so that a light propagating through the waveguide having the longer optical path has a larger phase change (hereinafter referred to as the "reciprocal phase difference") exactly by "π/2" by providing an optical path length difference equivalent to a one quarter wavelength (λ/4) between the two waveguides. When the waveguide having the longer optical path is allowed to have a phase difference (nonreciprocal phase difference) "−π/2" caused by the nonreciprocal phase shift effect in comparison to the waveguide having the shorter optical path, the light waves propagating through the two waveguides become in-phase for the forward propagating waves (they are output from the central output end of the branching/coupling devices). When the propagation direction is reversed, since the sign of the nonreciprocal phase difference is reversed, the waveguide having the longer optical path is given a nonreciprocal phase difference "+π/2". By adding the phase difference "+π/2" imparted due to the light path difference to the foregoing, the input to the tapered branching/coupling devices will be in the opposite phase state (i.e., phase difference π). As described above, a normal light and an abnormal light are thus isolated using the phase difference. One example of such a waveguide-type optical isolator is described in Japanese Patent No. 3407046 B2.

In addition, there exist the following Non-Patent Documents 1 to 4 on such a waveguide-type optical isolator.

Non-Patent Document 1: H. Yokoi, T. Mizumoto, N. Shinjo, N. Futakuchi and Y. Nakano, "Demonstration of an optical isolator, with a semiconductor guided layer that was obtained by use of a nonreciprocal phase shift", Applied Optics, vol. 39, No. 33, pp. 6158-6164 (2000)

Non-Patent Document 2: Yokoi, Mizumoto, Shinjo, Futakuchi, and Nakano, "Operation demonstration of an optical isolator having a semiconductor waveguide layer", IEICE Technical Report, OPE2000-10, pp. 3417-3421 (2000)

Non-Patent Document 3: T. Mizumoto, S. Mashimo, T. Ida, and Y. Naito, "In-plane magnetized rare earth iron garnet for a waveguide optical isolator employing non-reciprocal phase shift", IEEE Trans. MAG, vol. 29, No. 6, pp. 3417-3421 (1993)

Non-Patent Document 4: T. Mizumoto and Y. Naito, "Nonreciprocal propagation characteristics of YIG thin film", IEEE Trans. On Microwave Theory and Techniques, vol. MTT-30, No. 6, pp. 922-925 (1982)

Non-Patent Documents 1 and 2 report the actual trial manufacture of an optical isolator having a waveguide layer made of "GaInAsP" and an upper clad layer made of a magneto-optical material $CeY_2Fe_5O_{12}$ (Ce:YIG). Measurement results regarding the optical isolator's characteristics are reported. These Non-Patent documents 1 and 2 report that an isolation ratio (=backward loss−forward loss) of 4.9 [dB] is achieved for the optical isolator at a wavelength 1.55 [μm]. In these Non-Patent documents, in order to clarify the reproducibility of the phase shift amount of a reciprocal phase shifter, an isolator structure having a reciprocal phase shifter with a reciprocal phase shift amount π, which is easy to measure, is manufactured (in the case of Non-Patent Documents 1 and 2, only insufficient operation as an isolator is achieved) in order to measure the reciprocal phase shift amount.

Further, Non-Patent Document 3 proposes a structure using tapered branching/coupling devices as optical branching/coupling devices constituting an interference system in an interference optical isolator using the nonreciprocal phase shift effect and discloses a waveguide design. The nonreciprocal phase shift effect is obtained by orienting the magnetization of a magnetic garnet as a magneto-optical material to the waveguide layer in the in-plane direction (the direction parallel to the substrate surface). In order to reduce the magnitude of the magnetic field required to orient the magnetization, the magnetic garnet is required to be grown that has in-plane magnetization characteristics. Non-Patent Document 3 discloses the growth conditions for growing a garnet $(LuNdBi)_3(FeAl)_5O_{12}$ having the required in-plane magnetization characteristics using a liquid phase epitaxy method and shows the characteristics of the resultant magnetic garnet.

In Non-Patent Document 4, the amount of nonreciprocal phase shift generated for a TM-mode is measured through the magnetic garnet $Y_3Fe_5O_{12}$ (YIG) in order to demonstrate the nonreciprocal phase shift effect.

In the above-described conventional waveguide-type optical isolators, however, as shown in FIGS. 3A and 3B, when the operating wavelength is a desired wavelength, the above-described phase difference occurs, and ideal operation as a waveguide-type optical isolator is shown, but when the operating wavelength changes, the magnitudes of the nonreciprocal phase shift amount and the reciprocal phase shift amount change for both the forward propagating waves and the backward propagating waves. In other words, errors resulting from the design conditions, wherein interference optical paths are in-phase for the forward propagating waves and are in phase opposition for the backward propagating waves, occur, thereby to degrade the characteristics of the isolator. In FIG. 3A, "$\theta_R$" shows the reciprocal phase difference of an operating wavelength for the forward propagating waves and the backward propagating waves, "$-\theta_N$" shows the nonreciprocal phase difference of the operating wavelength for the forward propagating waves, and "$\theta_N$" shows the nonreciprocal phase difference of the operating wavelength for the backward propagating waves.

FIG. 3B shows a phase difference for the forward propagating waves and the backward propagating waves with the reciprocal phase difference and the nonreciprocal phase difference combined. When the inclinations of the changes in the phase differences with respect to the wavelength changes of the two light waves are compared to each other, the inclination of the backward propagating waves is larger than that of the forward propagating waves. This shows that when the difference between the operating wavelength and the designed wavelength increases, the degradation of the oscillation characteristics of a laser caused by insufficient suppression of the backward propagating waves, rather than by a diffusion loss of an incident light, significantly increases. First, for the diffusion amount of the backward propagating waves associated with changes in the operating wavelength, in a waveguide-type optical isolator having a designed wavelength 1.55 [μm], the characteristics of the changes in the operating wavelength and the diffusion amount (backward loss) of the backward propagating waves accompanying them is shown in FIG. 4.

In order to prevent the backward propagating waves from being irradiated on the optical laser, a certain level (generally, 30 [dB] is the required value) or more of the diffusion amount of the backward propagating waves is required. According to the characteristics shown in FIG. 4, the wavelengths showing a backward loss 30 [dB] or more are in the range of 1.54 to 1.56 [μm] (±0.01 [μm] with respect to the designed wavelength 1.55 [μm]). When the operating wavelength is not within that range, the backward propagating wave's diffusion effect on the waveguide-type optical isolator does not deliver a performance which satisfies the requirements.

On the other hand, for the insertion loss of the forward propagating waves associated with changes in the operating wavelength, in the waveguide-type optical isolator having the designed wavelength 1.55 [μm], the characteristics of the changes in the operating wavelength and the insertion loss (forward loss) of the forward propagating waves accompanying them are shown in FIG. 5.

The fact that when the operating wavelength deviates from the designed wavelength, the backward propagating waves have a larger inclination of a phase difference with respect to changes in the operating wavelength than the forward propagating waves (that is, the backward propagating waves have a higher wavelength-dependence than the forward propagating waves) has been described with reference to FIG. 4. A comparison of FIG. 4 with FIG. 5 highlights this fact. In the waveguide-type optical isolator having a designed wavelength 1.55 [μm], the insertion loss of the forward propagating waves when the operating wavelength is within the range of 1.44 [μm] to 1.64 [μm] is just 0.1 [dB], providing a remarkable difference from the operating wavelengths of 1.54 [μm] to 1.56 [μm], which still achieve the above-described backward propagating wave diffusion effect, thereby to satisfy the above-explained requirements.

As a result, since the wavelength-dependence of the isolation ratio defined by "backward loss–forward loss" is approximately determined by the wavelength-dependence of the backward loss, a conventional waveguide-type optical isolator cannot deliver the performance when the operating wavelength deviates from the wavelength range of 1.54 to 1.56 [μm].

In Non-Patent Documents 1 and 2, the obtained isolation characteristic is 4.9 [dB], which is insufficient for practical devices. In addition to this, the measurement wavelength of the isolation characteristic is 1.55 [μm], and the wavelength characteristics are not described. Furthermore, since a π/2-reciprocal phase shifter is used as the reciprocal phase shifter, the wavelength-dependence of the backward propagating waves is not eliminated.

In Non-Patent Document 3, as in the case of Non-Patent Documents 1 and 2, since a π/2-reciprocal phase shifter is used as the reciprocal phase shifter, the wavelength-dependence of the backward propagating waves is not eliminated. In addition to this, the magnetic garnet $(LuNdBi)_3(FeAl)_5O_{12}$ in Non-Patent Document 3 has a Faraday rotation coefficient −600 [deg/cm] (with the wavelength 1.31 [μm]), which is approximately 13% of the Faraday rotation coefficient of the magnetic garnet Ce:YIG of the present invention, having −4,500 [deg/cm]. This will be described later. As a result, a problem arises in that the nonreciprocal phase shifter increases in length by nearly 7.5 times.

Although Non-Patent Document 4 is significant in that the nonreciprocal phase shift effect as a physical phenomenon is experimentally verified, it does not provide or describe an actual device such as an optical isolator.

DISCLOSURE OF THE INVENTION

The present invention has been developed in view of the above-described circumstances. An object of the present invention is to provide a waveguide-type broadband optical isolator which has a broadened usable operating wavelength range with a wavelength-dependence of backward propagating waves reduced, and operates also on two wavelengths of a 1.31-μm band and a 1.55-μm band for use in long-distance optical fiber communications.

The present invention relates to a waveguide-type broadband optical isolator, the above object is achieved by the waveguide-type broadband optical isolator comprising: a reciprocal phase shifter which makes a phase difference 3π/2 between a first light wave propagating through a first waveguide and a second light wave propagating through a second waveguide, with a fundamental operating wavelength λ, and a nonreciprocal phase shifter which provides a phase difference π/2 for forward propagating waves and a phase difference −π/2 for backward propagating waves.

Further, the object of the invention is achieved by comprising: a reciprocal phase shifter which makes a phase difference "(x+¾)×2π" between a first light wave propagating through a first waveguide and a second light wave propagating through a second waveguide, with "x" being an integer of zero or more in a fundamental operating wavelength λ, and a nonreciprocal phase shifter which provides a phase difference π/2 for the forward propagating waves and a phase difference −π/2 for the backward propagating waves, or by a waveguide-type broadband optical isolator, wherein directions of magnetic field applications to a magneto-optical material of said nonreciprocal phase shifter are opposite, or a waveguide-type broadband optical isolator, wherein said reciprocal phase shifter has a predetermined waveguide width which is not less than a waveguide width of said first waveguide or said second waveguide, and a waveguide effective refractive index is changed, or a waveguide-type broadband optical isolator, wherein said reciprocal phase shifter has a tapered waveguide in a propagation direction of a light wave and includes said tapered waveguide in part of the other waveguide, too, or a waveguide-type broadband optical isolator, wherein said first waveguide includes said reciprocal phase shifter, said second waveguide has an adjustment section for adjusting a phase shift by said reciprocal phase shifter, and said adjustment section has an optical path length $L_2$ and a waveguide propagation constant $\beta_2$ satisfying a formula "$\beta_1 \times L_1 - \beta_2 \times L_2 = (x+¾) \times 2\pi$", wherein, "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more, or a waveguide-type broadband optical isolator, wherein a width and a length of said first or second waveguide constituting said reciprocal phase shifter are changed in order to adjust a reciprocal phase difference, or a waveguide-type broadband optical isolator, which operates on two wavelengths of a 1.31-μm band and a 1.55-μm band.

BRIEF DESCRIPTION OF THE DRAWINGS

In the accompanying drawings:

FIG. 1 is a perspective structural diagram showing an example of a conventional interference-type optical isolator (waveguide-type optical isolator);

FIGS. 2A to 2C are diagrams explaining an operating principle of a conventional waveguide-type optical isolator;

FIGS. 7A and 7B are diagrams explaining an operating principle at a design wavelength of a waveguide-type optical isolator according to the present invention;

FIGS. 8A and 8B are diagrams showing a characteristic example of a change of operating wavelength and a corresponding phase-difference change of a waveguide-type optical isolator according to the present invention;

BEST MODE FOR CARRYING OUT THE INVENTION

Figure 3A:
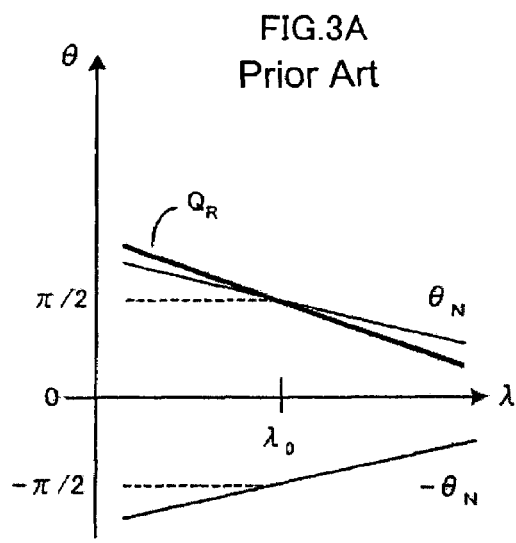
FIGS. 3A and 3B are diagrams showing a characteristic example of a change of operating wavelength and a corresponding phase-difference change of a conventional waveguide-type optical isolator.

The waveguide-type broadband optical isolator according to the present invention, when an operating wavelength which is the same as a designed wavelength is made incident on an optical isolator, provides both forward propagating waves and backward propagating waves with a reciprocal phase shift amount $3\pi/2$, provides the forward propagating waves with a nonreciprocal phase shift amount $+\pi/2$, and provides the backward propagating waves with a nonreciprocal phase shift amount $-\pi/2$, thereby to provide a light wave propagating through two waveguides with a phase difference $2\pi$ for the forward propagating waves and a phase difference $\pi$ for the backward propagating waves. In other words, the forward propagating waves are in-phase, while the backward propagating waves are in phase opposition. These phase differences allow the forward propagating waves to be output from a central end of branching/coupling devices and the backward propagating waves to be output from unnecessary light output ends arranged on the sides of the central end.

Since the forward propagating waves are given the sum of the reciprocal phase shift amount and the nonreciprocal phase shift amount, while the backward propagating waves are given the difference between the reciprocal phase shift amount and the nonreciprocal phase shift amount, the backward propagating waves have a smoother slope than the forward propagating waves with respect to changes in phase deviation due to changes in the operating wavelength when the operating wavelength deviates from the designed wavelength. This allows the deviation from the phase difference $\pi$ to be minimized when the operating wavelength deviates from the designed wavelength.

This reduces a wavelength-dependence of a backward loss and stabilizes a value "backward loss–forward loss" defining an isolation ratio, thereby to achieve a band broadening.

In addition to the above, by changing the wavelength-dependence of a waveguide effective refractive index by adjusting the waveguide width, by changing the waveguide length, or by changing a waveguide width and a waveguide length, the wavelength-dependence of the reciprocal phase difference is adjusted, the wavelength-dependence of the nonreciprocal phase difference is eliminated, and any deviation in the phase change by the operating wavelength is corrected. As a result, the wavelength-dependence is adjusted so that absolute values of the deviations from the designed values of the nonreciprocal phase difference and the reciprocal phase difference become equal to each other, thereby to achieve the band broadening of the optical isolator.

Hereinafter, the waveguide-type broadband optical isolator according to the present invention will be described with reference to the drawings. The overall structure of the waveguide-type broadband optical isolator according to the present invention is the same as the conventional waveguide-type optical isolator shown in FIG. 1 except that the magnetic field applying direction is reversed, and therefore a description of which will be omitted.

Figure 6:
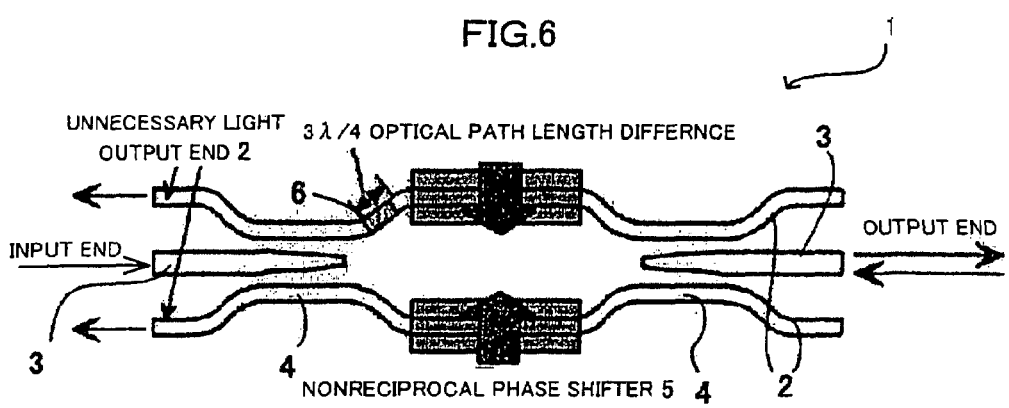
FIG. 6 is a sectional view showing a constructional example of a waveguide portion of a waveguide-type broadband optical isolator according to the present invention.

FIG. 6 is a diagram showing the structure of the waveguide part of a waveguide-type broadband optical isolator 1, and FIGS. 7A and 7B are diagrams showing the operating principles at a designed wavelength.

The waveguide section of the waveguide-type broadband optical isolator 1 comprises unnecessary light output ends 2 allowing a reflected light or the like which may be abnormal light for the incident light of an optical laser to be diffused, a central end 3 which is an input end and an output end of the optical laser, branching/coupling devices 4 for branching/coupling forward propagating waves and backward propagating waves, a nonreciprocal phase shifter 5 for generating a phase difference by applying a magnetic field to the forward propagating waves and the backward propagating waves, and a reciprocal phase shifter 6 for generating a reciprocal phase difference by providing an optical path length difference for each of the two forward propagating waves and backward propagating waves branched by the branching/coupling devices 4.

The nonreciprocal phase shifter 5 for providing a nonreciprocal phase shift allows that a magnetic field applying direction is an opposite direction, and provides a phase difference +π/2 between the forward propagating waves having the designed wavelength and propagating through two waveguides and a phase difference −π/2 between the backward propagating waves.

On the other hand, the reciprocal phase shifter 6 provides a phase difference 3π/2 to both the forward propagating waves and the backward propagating waves having the designed wavelength. The reciprocal phase shifter 6 is therefore designed to generate an optical path length difference 3λ/4 (hereinafter the "designed wavelength" is "λ" ) between two waveguides.

As a result, the forward propagating waves are input from the central end 3 on an input side, and are branched by the branching/coupling devices 4. The forward propagating waves are given a phase difference 3π/2 by the reciprocal phase shifter 6, and are given a phase difference +π/2 by the nonreciprocal phase shifter 5. When they are coupled by the branching/coupling devices 4 on an output side, a phase difference 2π occurs in the forward propagating waves. Since the phase difference 2π has the same meaning as a phase difference of zero, they are output from the central end 3 on the output side (FIG. 7A).

Conversely, the backward propagating waves (reflected return light) are input from the central end 3 on the output side, and are branched by the branching/coupling devices 4. The backward propagating waves are given a phase difference 3π/2 by the reciprocal phase shifter 6, and are given a phase difference −π/2 by the nonreciprocal phase shifter 5. When they are coupled by the branching/coupling device 4 on the input side, a phase difference π occurs in the backward propagating waves, thereby to allow them to be diffused from the unnecessary light output ends 2 on the input side (FIG. 7B).

Although the optical path length difference of the reciprocal phase shifter 6 is set to be "3λ/4" with the designed wavelength λ for simplicity, the optical path length difference given by the reciprocal phase shifter 6 may have a length according to the following formula (1)

$$(x+3/4)\lambda \quad (1)$$

wherein, "x" is an integer of zero or more.

This can provide both the forward propagating waves and the backward propagating waves having a reciprocal phase difference "$(x+3/4) \times 2\pi$".

Further, the waveguide-type broadband optical isolator 1 may be constructed with the nonreciprocal phase difference caused by the nonreciprocal phase shifter being an odd-numbered (three or more) multiple of "π/2". However, since a propagation distance required for a desired nonreciprocal phase shift amount is longer than a propagation distance required for a reciprocal phase shift amount of the same magnitude by three orders or more, the above method for making the nonreciprocal phase difference an odd-numbered (three or more) multiple of "π/2" is not realistic. In the following description, for the sake of simplicity, a phase change caused by the reciprocal phase shifter 6 will be "3π/2".

Characteristic examples of the wavelength-dependence of the reciprocal phase difference $\theta_R$ and the nonreciprocal phase difference ("$\theta_N$" for the forward propagation, "$-\theta_N$" for the backward propagation) of the above waveguide-type broadband optical isolator 1 are shown in FIGS. 8A and 8B. The wavelength-dependence of the reciprocal phase difference and the nonreciprocal phase difference is represented by a slope $\theta_R$ of changes in the reciprocal phase shift amount with respect to changes in the operating wavelength in the reciprocal phase shifter 6 and slopes ("$\theta_N$" for forward propagation and "$-\theta_N$" for backward propagation) of changes in the nonreciprocal phase shift amount with respect to changes in the operating wavelength in the nonreciprocal phase shifter 5 (FIG. 8A). Since the slope $\theta_R$ and the slope $\theta_N$ have the same sign, the wavelength-dependence of a phase difference "$-\theta_N+\theta_R$" which occurs in the backward propagating waves can be reduced. Therefore, the wavelength-dependence of the phase difference which occurs in the forward propagating waves increases in comparison to a case where the reciprocal phase difference is "π/2", while the wavelength-dependence of the phase difference which occurs in the backward propagating waves is reduced. As a result, the operating wavelength range of the waveguide-type optical isolator can be thus broadened.

Figure 9:
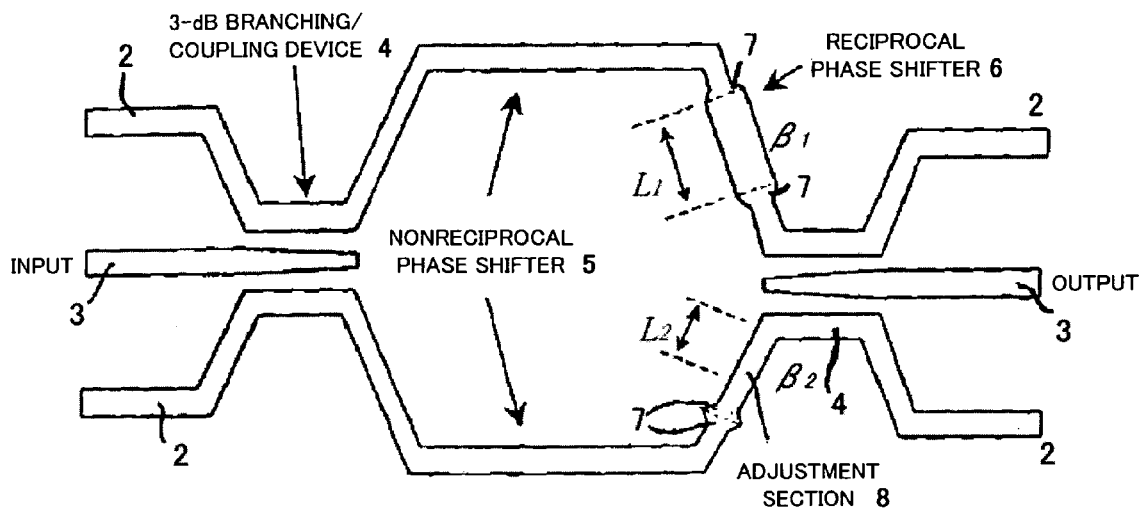
FIG. 9 is a sectional view showing a waveguide constructional example of a reciprocal phase shifter for changing a wavelength-dependence of a reciprocal phase difference.

FIG. 9 is a diagram showing the waveguide structure of the reciprocal phase shifter 6 used for changing the wavelength-dependence of the reciprocal phase difference.

As described above, for the designed wavelength λ, the provision of a light wave with a reciprocal phase difference 3π/2 by the reciprocal phase shifter 6 can only be realized by providing the reciprocal phase shifter 6 with a waveguide length 3λ/4. However, when the operating wavelength deviates from the designed wavelength λ, phase differences obtained for the nonreciprocal phase shifter 5 and the reciprocal phase shifter 6 deviate from the phase shift amounts of the designed wavelengths π/2 and 3π/2. Although these deviations can be eliminated by the above-described phase shift amounts using the nonreciprocal phase shifter 5 and the reciprocal phase shifter 6, in order to eliminate them more effectively, fine adjustments can be made on the reciprocal phase shifter 6. The above fine adjustments can be achieved by changing the waveguide width of the reciprocal phase shifter 6 and further by changing the waveguide effective refractive index accompanying it in order to reduce the deviation of the phase difference.

The reciprocal phase shifter 6 changes the waveguide width for the other waveguide, and has a propagation constant $\beta_1$ and an optical path length $L_1$. This reciprocal phase shifter 6 is arranged on one of the waveguides branched by the branching/coupling device 4 on the input side of the waveguide-type broadband optical isolator 1 in order to allow both the forward propagating waves and the backward propagating waves propagating therethrough to generate the same phase difference. The reciprocal phase shift effect caused by the reciprocal phase shifter 6 is determined by the following formula (2), and the wavelength-dependence is expressed in a term of "2π/wavelength×waveguide effective refractive index".

$$2\pi/\text{wavelength} \times \text{waveguide effective refractive index} \times \text{optical path length} \quad (2)$$

In other words, generally, for the same waveguide, a value of "2π/wavelength×waveguide effective refractive index" is larger on the shorter-wavelength side.

Figure 10:
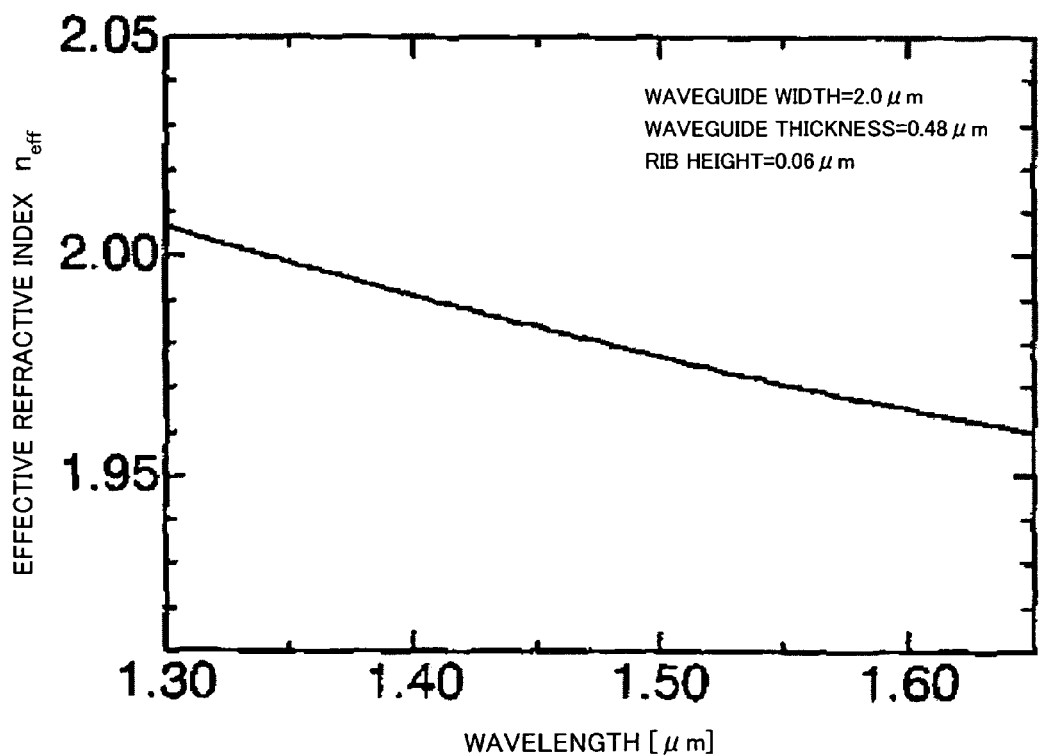
FIG. 10 is a diagram showing a characteristic example to indicate a wavelength-dependence of a waveguide effective refractive index based on an operating wavelength.

Taking air (upper clad layer)/Ce:YIG (waveguide layer)/((Ca, Mg, Zr)–doped $Gd_3Ga_5O_{12}$) (NOG) substrate (lower clad layer) as an example, the wavelength-dependence of the waveguide effective refractive index by the operating wavelength for the waveguide width 2.0 [μm], the waveguide layer thickness 0.48 [μm] and the rib height 0.06 [μm] is shown in FIG. 10. As shown, the longer the wavelength, the smaller the waveguide effective refractive index. That is, the shorter the wavelength, the larger the "2π/wavelength", and the waveguide effective refractive index is larger on the shorter-wavelength side, thereby to increase the value "2π/wavelength×waveguide effective refractive index" on the shorter-wavelength side.

Figure 11:
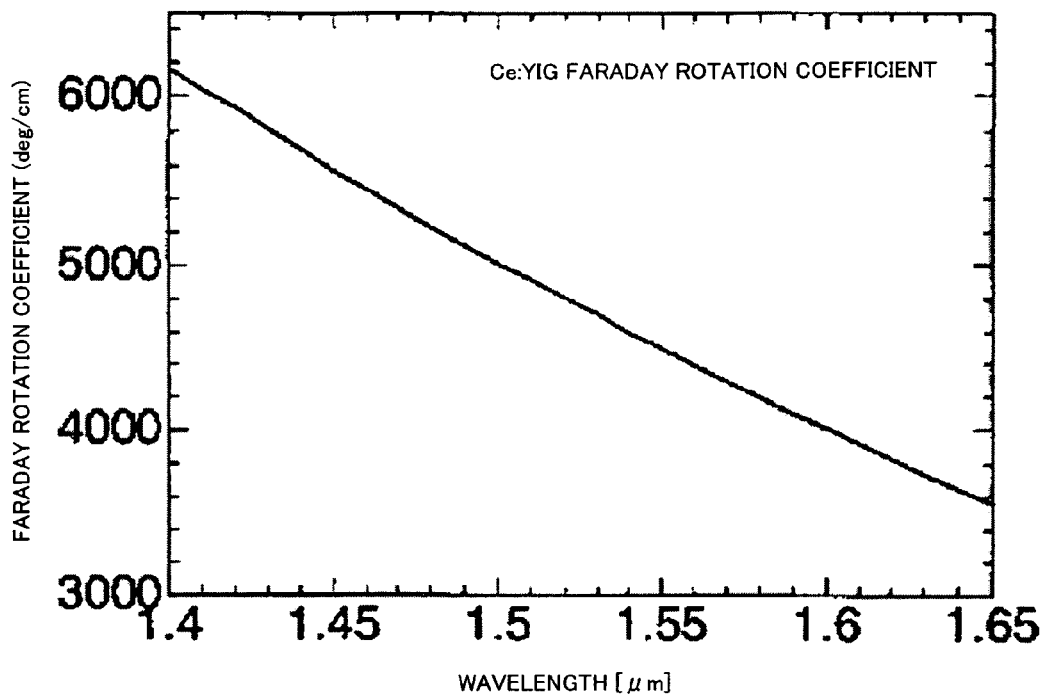
FIG. 11 is a diagram showing a characteristic example to indicate a wavelength-dependence of a Faraday rotation coefficient of Ce:YIG.
Figure 12:
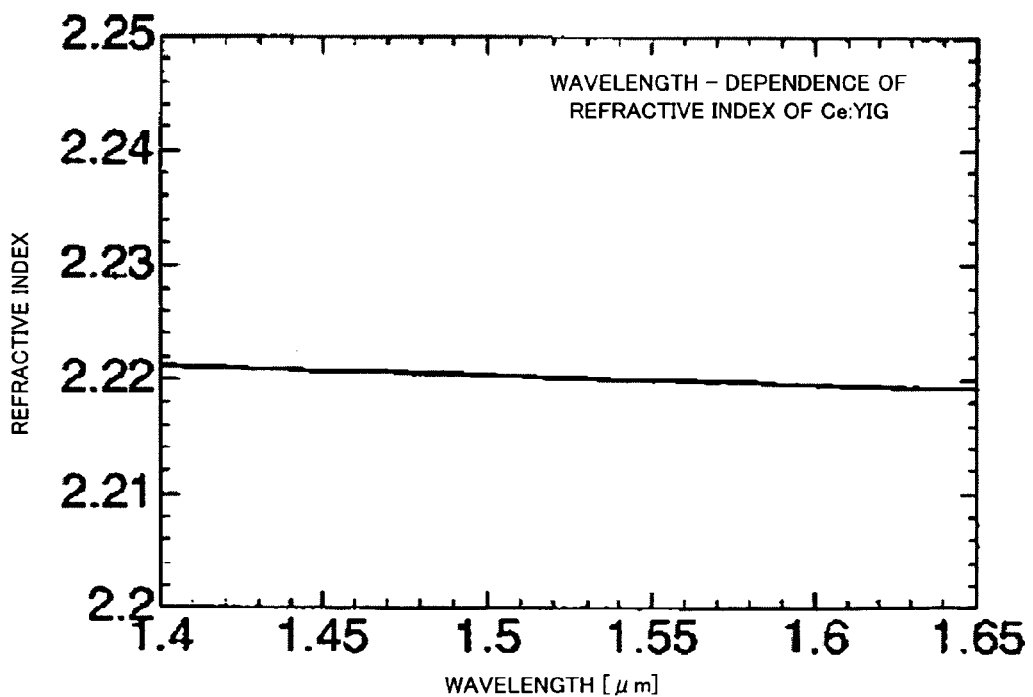
FIG. 12 is a diagram showing a characteristic example to indicate a wavelength-dependence of a refractive index of Ce:YIG.

On the other hand, the wavelength-dependence of the nonreciprocal phase shift effect caused by the nonreciprocal phase shifter 5 is approximately determined by the wavelength-dependence of the magneto-optical coefficient of the magneto-optical material (the magnetic garnet), and a larger nonreciprocal phase shift effect can be obtained on the shorter-wavelength side. A characteristic example showing the wavelength-dependence of the Faraday rotation coefficient of the magnetic garnet "Ce:YIG" is shown in FIG. 11, while a characteristic example showing the wavelength-dependence of the refractive index "Ce:YIG" is shown in FIG. 12.

Considering the backward propagating waves caused by the nonreciprocal phase shifter 5 and the reciprocal phase shifter 6, a deviation from the phase difference $\pi$ can be reduced even when the operating wavelength deviates from the designed wavelength $\lambda$ by bringing the nonreciprocal phase shift amount and the reciprocal phase shift amount close to each other. Therefore, in the present invention, by changing the waveguide width of the reciprocal phase shifter 6 in order to change the waveguide effective refractive index, the wavelength-dependence for the backward propagating waves can be cancelled, as shown in the following formula (3).

$$2\pi/\text{wavelength} \times \text{waveguide effective refractive index} \times \text{optical path length} - \text{nonreciprocal phase difference} \approx \pi \quad (3)$$

Figure 13:
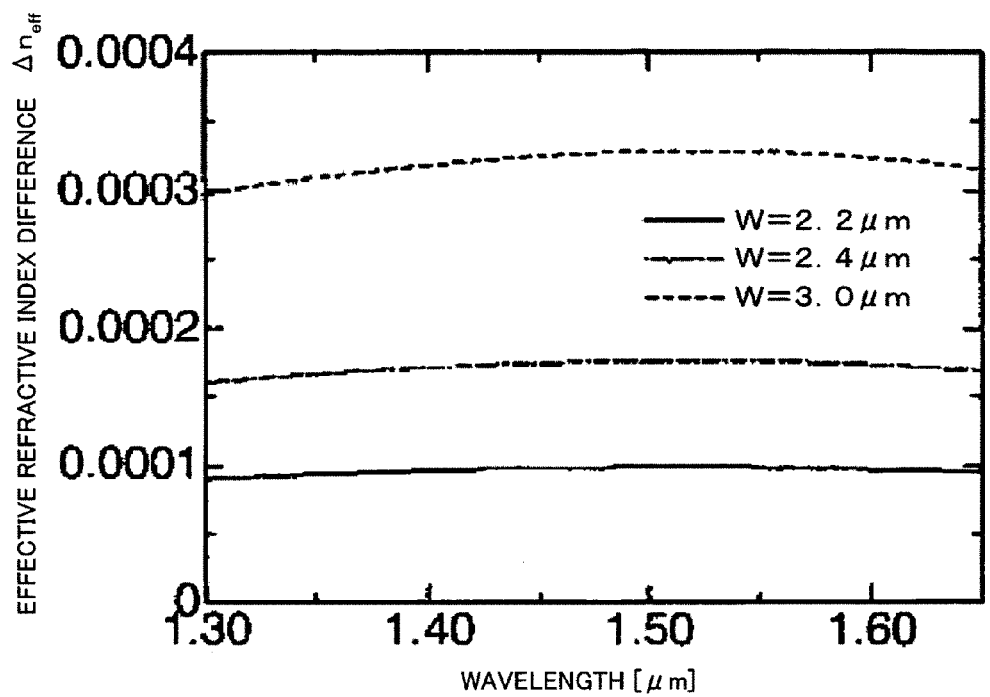
FIG. 13 is a diagram showing a characteristic example to indicate a wavelength-dependence of a deviation between a waveguide effective refractive index of a waveguide width W=2 μm and the same of waveguide widths 2.2 μm, 2.4 μm and 3.0 μm.

Taking air (upper clad layer)/Ce:YIG (waveguide layer)/NOG substrate (lower clad layer) as an example, characteristic examples of the wavelength-dependence of the deviation of the waveguide effective refractive index in a case that the wavelength width is 2.2 [μm], 2.4 [μm] and 3.0 [μm] from the waveguide effective refractive index of the waveguide with a width 2.0 [μm] are shown in FIG. 13. Using the wavelength-dependence of the waveguide effective refractive index, a term of the waveguide effective refractive index is adjusted in order to achieve the approximation of the nonreciprocal phase shift effect to the wavelength-dependence.

In order to further broaden the operating range of the waveguide-type broadband optical isolator, the reciprocal phase difference is adjusted by changing not only the width of the waveguide but also the length thereof. An adjustment section 8 having an optical path length $L_2$ with an unchanged waveguide width is provided in the waveguide facing the reciprocal phase shifter 6. When the propagation constant of the waveguide other than the reciprocal phase shifter 6 is set to be "$\beta_2$" the following formula (4) holds at the designed wavelength $\lambda$.

$$\beta_1 \times L_1 - \beta_2 \times L_2 = 3\pi/2 \quad (4)$$

By changing the width and length of the waveguide so that a deviation of the reciprocal phase difference "$\beta_1 \times L_1 - \beta_2 \times L_2$" from "$3\pi/2$" when the wavelength changes becomes equal to the deviation of the nonreciprocal phase difference from "$\pi/2$", fine adjustments on the waveguide changes of the reciprocal phase shifter 6 can be made.

As a result, when one optical path length of the part other than the reciprocal phase shifter 6 between the branching/coupling devices 4 is set to be "$L_0$", the optical path length $L_{01}$ between the branching/coupling devices 4 of the waveguide on the reciprocal phase shifter 6 side is represented by the following formula (5).

$$L_{01} = \text{section } L_0 \text{ with propagation constant } \beta_2 + \text{section } L_1 \text{ with propagation coefficient } \beta_1 \text{ (reciprocal phase shifter 6)} \quad (5)$$

Further, the optical path length $L_{02}$ between the branching/coupling devices 4 of the other waveguide is represented by the following formula (6).

$$L_{02} = \text{section } L_0 \text{ with propagation constant } \beta_2 + \text{section } L_2 \text{ with propagation coefficient } \beta_2 \text{ (adjustment section 8)} \quad (6)$$

When changing the waveguide width, an abrupt change causes reflection and radiation of the propagating light at the boundary between two waveguides with different widths, leading to a propagation loss. So, a tapered waveguide 7, of which the waveguide width gradually changes in the propagation directions of both the forward propagating waves and the backward propagating waves, is inserted into a connecting part of a section of different waveguides. Since the tapered waveguide 7 causes an unintentional phase difference on the reciprocal phase shifter 6 side, a tapered waveguide 7 is also inserted into other waveguide, thereby to compensate for any imbalance between the two waveguides caused by the insertion of the tapered waveguide 7.

The results showing how the wavelength-dependence of the reciprocal phase difference changes when the width and length of the waveguide change are calculated will now be described.

Figure 14:
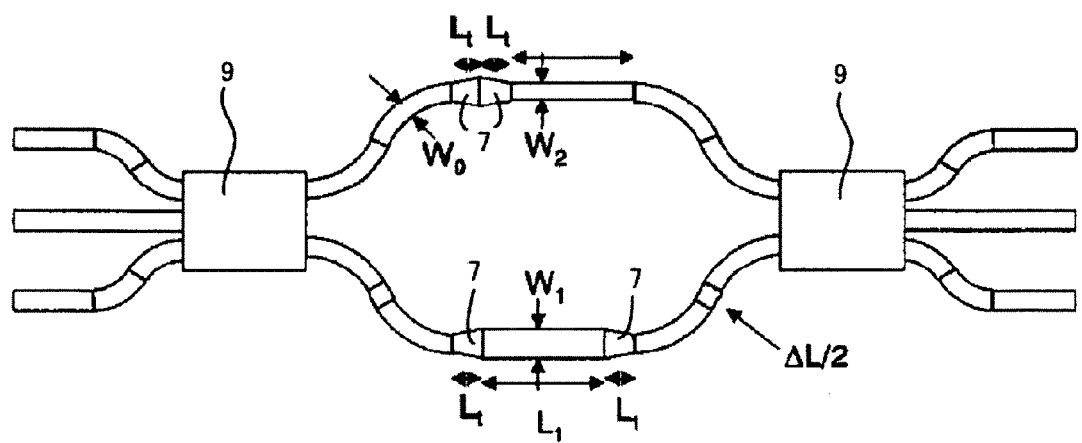
FIG. 14 is a sectional view showing a mechanism to adjust a wavelength-dependence of a reciprocal phase difference.
Figure 15:
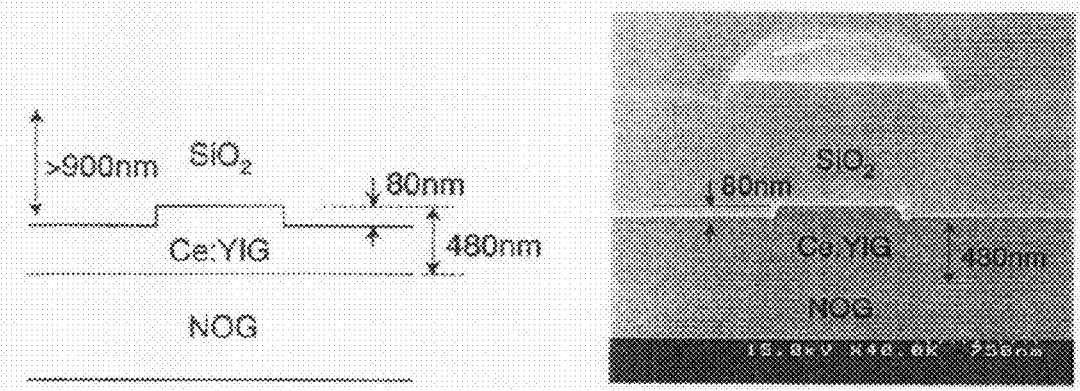
FIG. 15 is sectional view showing a waveguide structure constituting an optical isolator.

The waveguide structure of the waveguide-type broadband optical isolator being discussed is shown in FIG. 14. Instead of using the tapered branching/coupling devices in the coupling/branching section, a multimode interference coupling device (an MMI coupler) 9 is used. The use of a multimode branching/coupling device can achieve a coupling/branching characteristic with a small wavelength-dependence. By changing the width $W_1$ and the length $L_1$ of the waveguide 1, the reciprocal phase difference is able to adjust. The waveguide cross-sectional structure of the optical isolator is shown in FIG. 15.

Figure 3B:
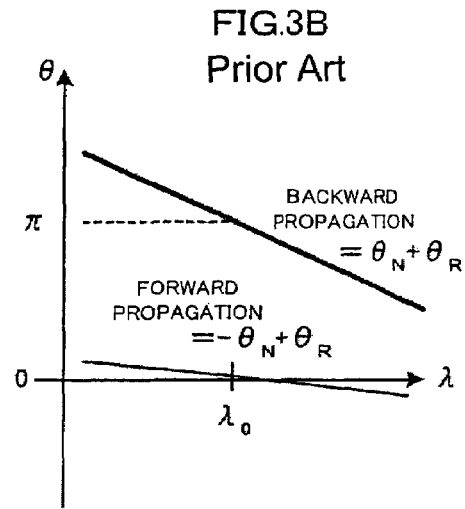
Figure 4:
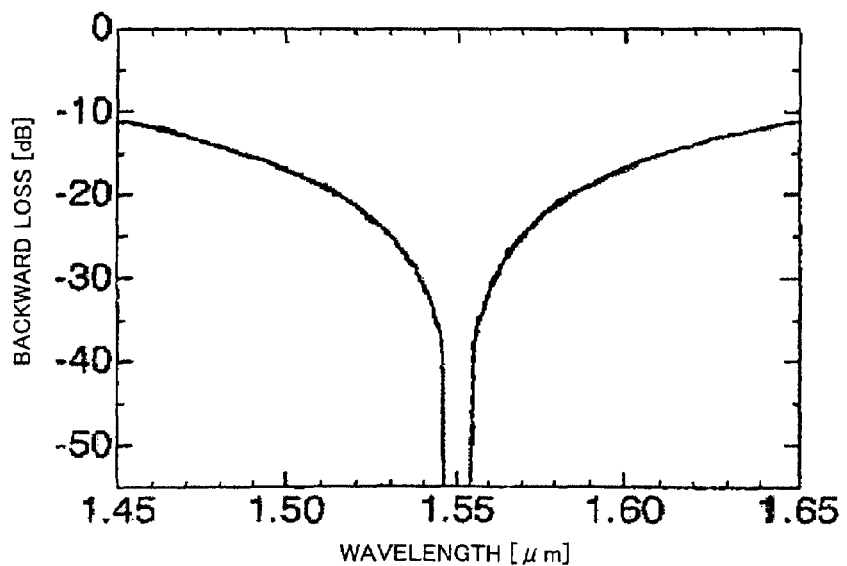
FIG. 4 is a diagram showing a characteristic example of a change of operating wavelength and a diffusion amount (backward loss) of corresponding backward direction propagation waves of a conventional waveguide-type optical isolator.
Figure 5:
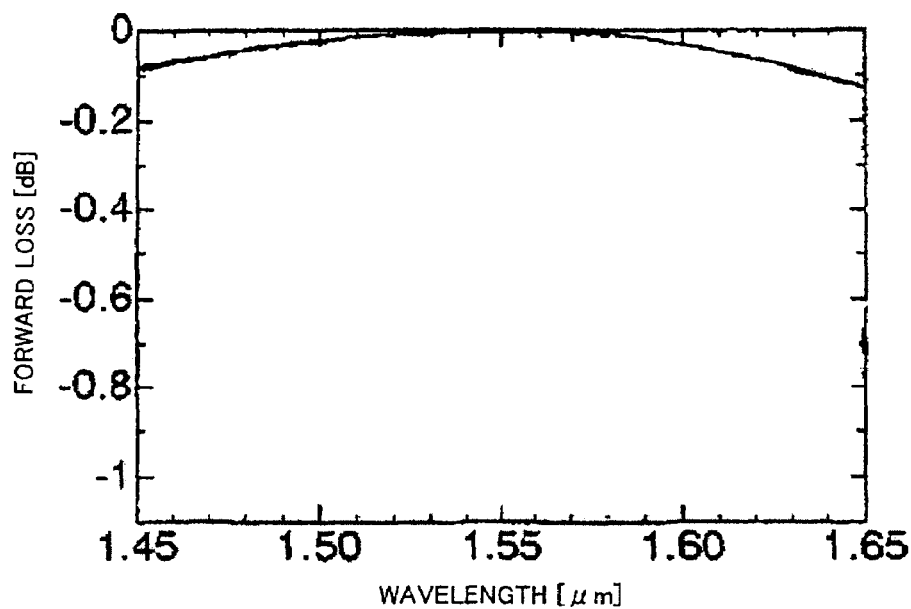
FIG. 5 is a diagram showing a characteristic example of a change of operating wavelength and an insertion loss (forward loss) of corresponding forward direction propagation waves of a conventional waveguide-type optical isolator.
Figure 16:
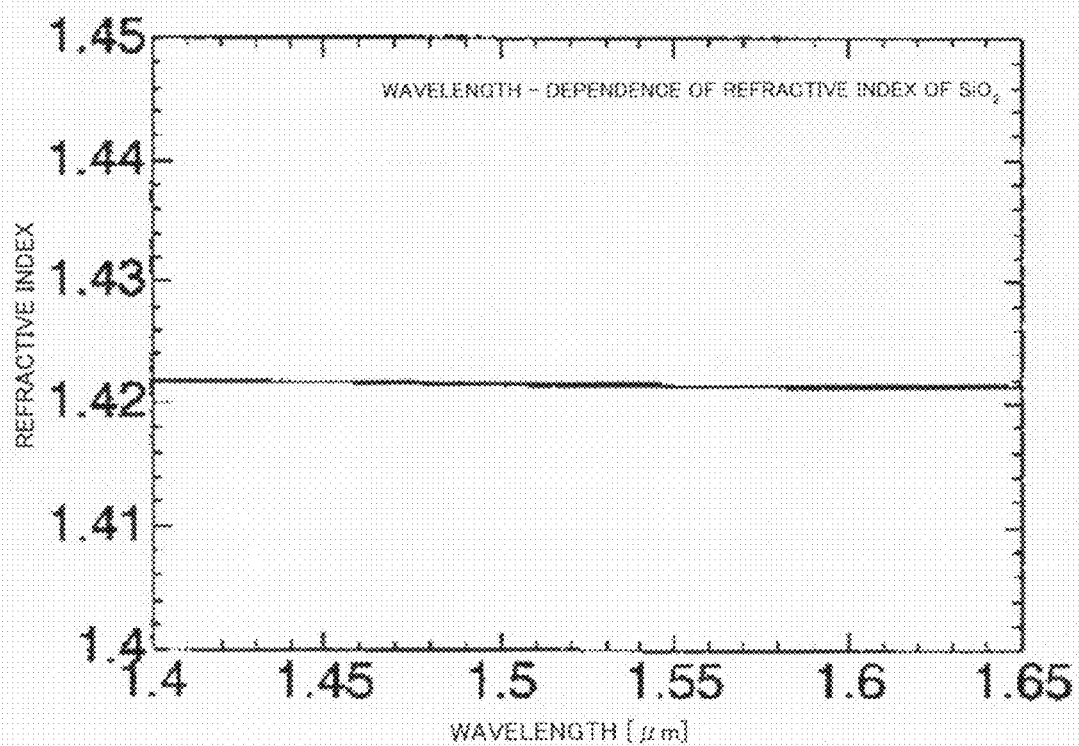
FIG. 16 is a diagram showing a characteristic example of a wavelength dependence of a refractive index of $SiO_2$.
Figure 17:
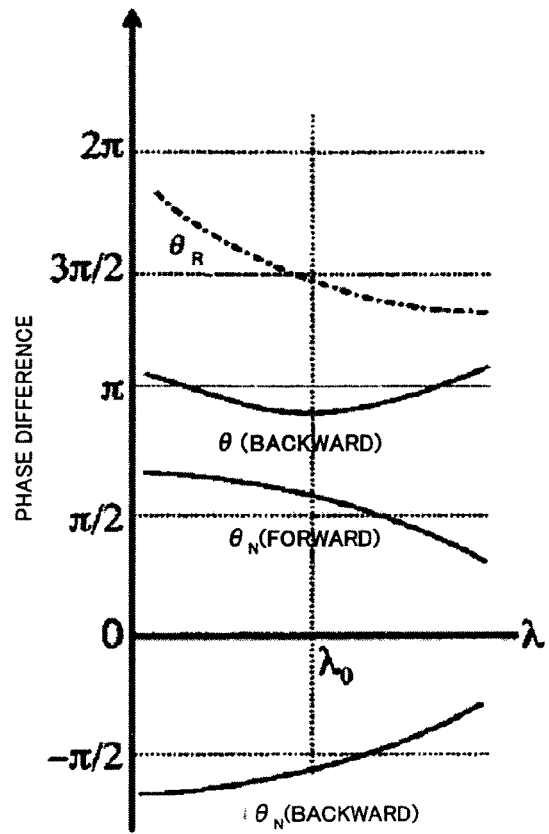
FIG. 17 is a diagram showing a characteristic example of a wavelength-dependence of a reciprocal phase difference $\theta_R$.
Figure 18A:
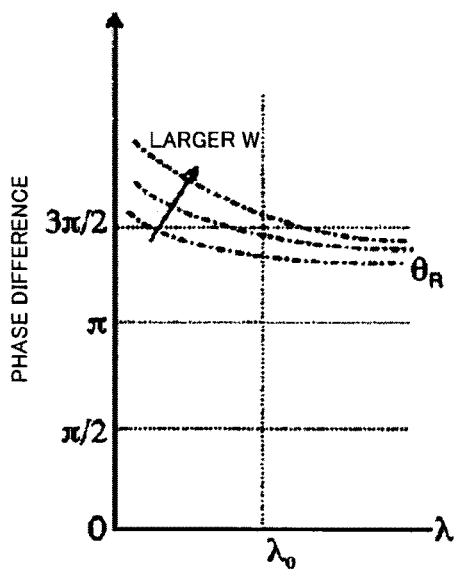
FIGS. 18A and 18B are diagrams showing a characteristic change example of a wavelength-dependence of a reciprocal phase difference $\theta_R$ when width and length of a waveguide are changed.
Figure 18B:
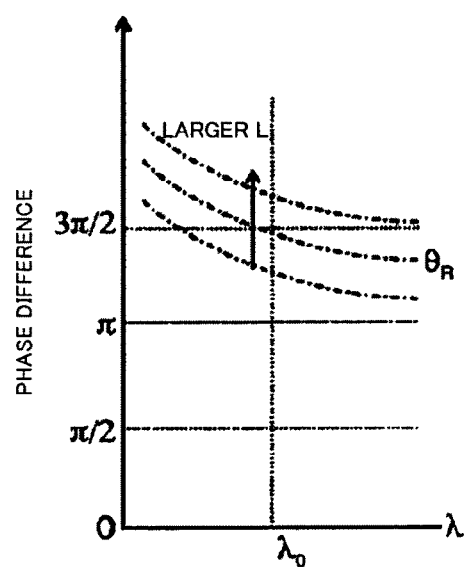

The optical isolator has a waveguide layer comprising a magneto-optical material Ce:YIG, an upper clad layer of "$SiO_2$", and a lower clad layer of a NOG-substrate for crystal-growing the magneto-optical material Ce:YIG. The wavelength-dependence (FIG. 12) of the refractive index of "Ce:YIG" and the wavelength-dependence (FIG. 16) of the refractive index of "$SiO_2$" are used for calculating the reciprocal phase difference. The typical wavelength-dependence of the reciprocal phase difference $\theta_R$ and the nonreciprocal phase difference $\theta_N$ is shown in FIG. 17. Although in FIGS. 3 and 8 the wavelength-dependences of these phase differences are represented by straight lines for simplicity, in an actual waveguide the wavelength-dependences show rounded changes as shown in FIG. 17. When the width $W_1$ of the waveguide 1 is changed, the reciprocal phase difference shows a wavelength-dependence as shown in FIG. 18A. When the length $L_1$ of the waveguide 1 is changed, the reciprocal phase difference also shows a wavelength-dependence as shown in FIG. 18B. Thus, by using the dependence of the reciprocal phase difference on the width and the length of the waveguide, the phase difference of the backward propagating waves can be designed to coincide with an ideal value $\pi$.

By using the above feature, a waveguide-type broadband optical isolator can be manufactured which has a backward loss of 30 [dB] or more over the entire wavelength range covering two wavelengths of a 1.31-μm band (1.26 to 1.36 [μm]) and a 1.55-μm band (1.53 to 1.625 [μm]). This feature therefore enables a successful operation of a waveguide-type optical isolator in the two wavelengths of the 1.31-μm band and the 1.55-μm band, making the isolator ideal for use in long-distance optical fiber communications.

Hereinafter, Embodiments using the waveguide-type broadband optical isolators according to the present invention will be described.

Embodiment-1

Figure 19:
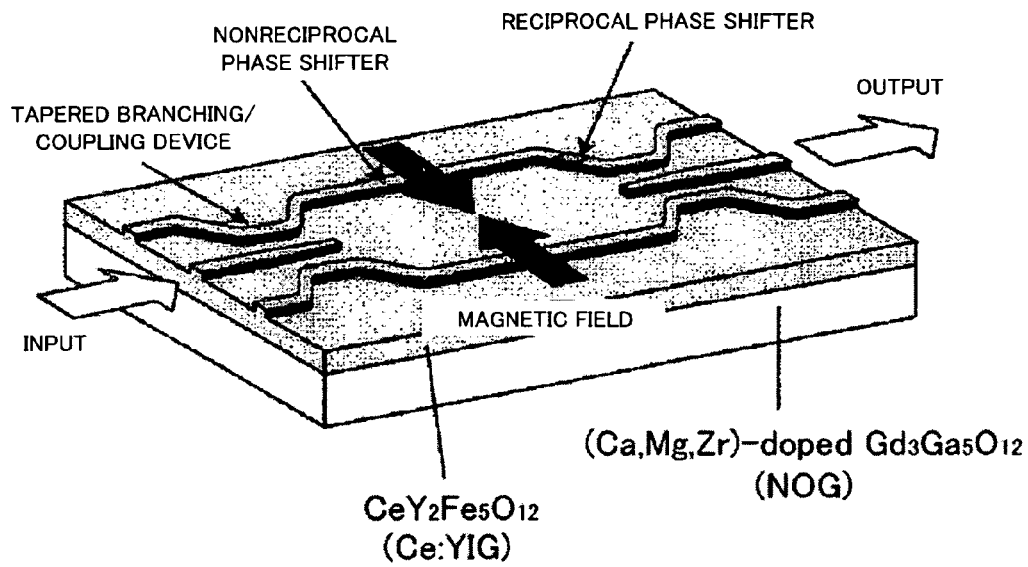
FIG. 19 is a perspective structural diagram showing an example of a waveguide-type optical isolator of which a waveguide layer is a magneto-optical material Ce:YIG.

Band broadening in a waveguide-type optical isolator having a waveguide layer comprising the magneto-optical material Ce:YIG ($CeY_2Fe_5O_{12}$) shown in FIG. 19 will now be described as Embodiment-1.

Since "Ce:YIG" is the magneto-optical material, the wavelength-dependence of the Faraday rotation coefficient of "Ce:YIG" must be considered. For the wavelength-dependence of the Faraday rotation coefficient of "Ce:YIG", "Ce:YIG" having the values shown in FIG. 11 is used. Further, for the wavelength-dependence of the refractive index of "Ce:YIG", "Ce:YIG" having the values shown in FIG. 12 is used. On the basis of these values, a waveguide-type optical isolator having a waveguide layer comprising "Ce:YIG" is considered.

The layer structure of the waveguide is air (upper clad)/Ce:YIG (waveguide layer)/NOG (lower clad). In order to minimize the wavelength-dependence of the backward propagating waves, the reciprocal phase shifter 6 shown in FIG. 9 is formed in which $L_1$=10.0 [µm], $L_2$=10.59 [µm], $W_1$=2.4 [µm] and $W_2$=2.0 [µm] (where, "$W_1$" is the waveguide width of the reciprocal phase shifter 6, and "$W_2$" is the width of the other waveguide that does not include the reciprocal phase shifter). The thickness of the Ce:YIG-waveguide layer is set to be 0.48 [µm].

Figure 20:
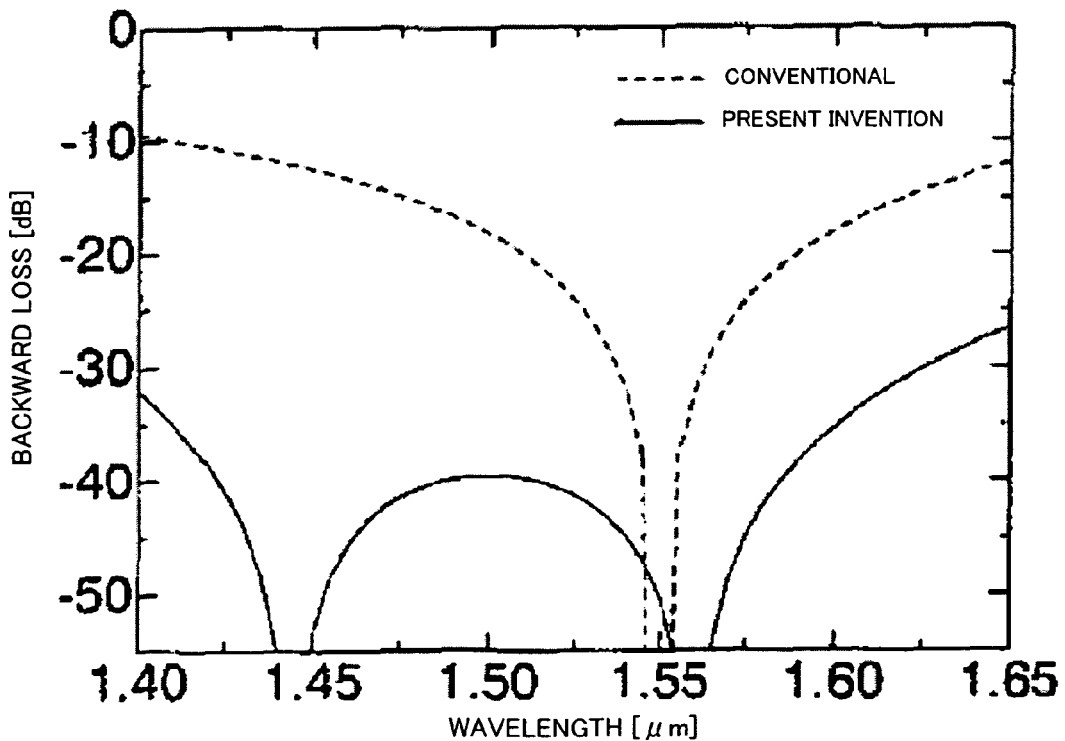
FIG. 20 is a diagram showing a characteristic example of a loss amount (backward loss amount) to a backward propagation wave.
Figure 21:
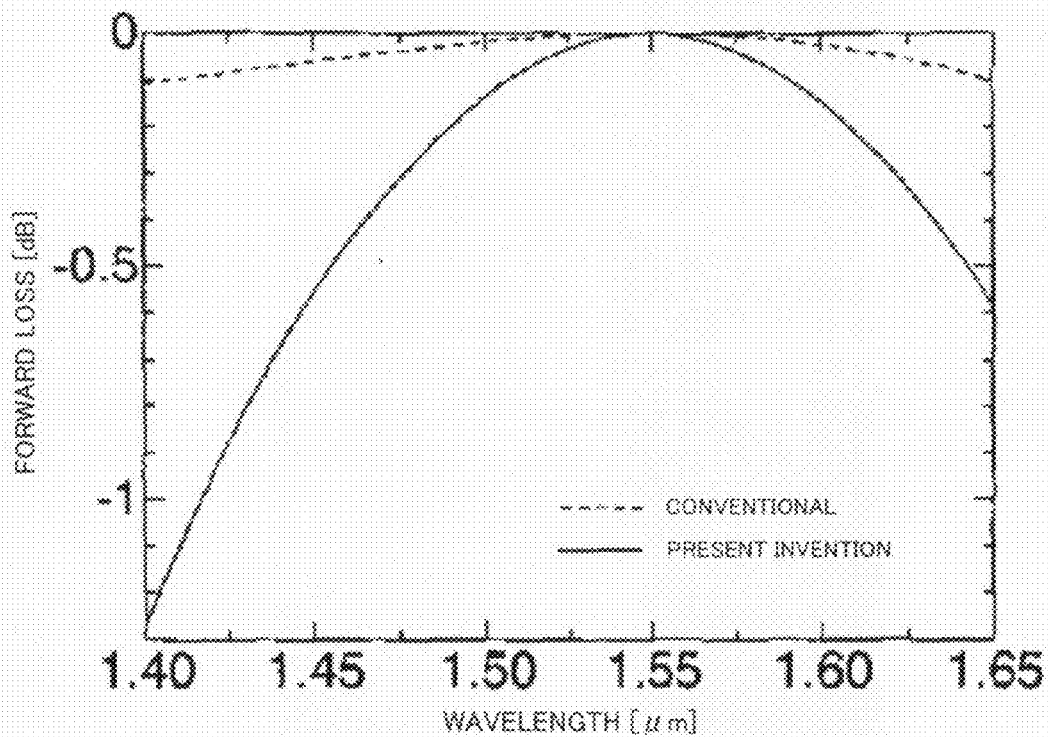
FIG. 21 is a diagram showing a characteristic example of a loss amount (forward loss amount) to a forward propagation wave.

A characteristic example of a loss amount (a diffusion amount) for the backward propagating waves of the waveguide-type optical isolator obtained by the above design is shown in FIG. 20, while a characteristic example of a loss amount (a forward loss amount) for the forward propagating waves is shown in FIG. 21.

The present waveguide-type broadband optical isolator can provide a backward loss (a diffusion amount) of 30 [dB] or more over the wavelengths in the range of 1.40 [µm] to 1.63 [µm] (in comparison, a conventional optical isolator provides a backward loss of 30 [dB] or more over the wavelengths in the range of 1.54 [µm] to 1.56 [µm]). Conversely, a conventional optical isolator has smaller wavelength-dependence for the forward propagating waves, and in the present waveguide-type broadband optical isolator it increases to approximately 1.3 [dB] at a band end (at the wavelength of 1.40 [µm]), which provides the largest insertion loss amount within the band having a backward loss (a diffusion amount) of 30 [dB] or more (in the conventional optical isolator, the insertion loss is 0.1 [dB] at the same wavelength). However, the wavelength-dependence of an isolation ratio defined by "backward loss–forward loss" is approximately determined by the wavelength-dependence of the backward loss, and as such, the present invention achieves remarkable band broadening. The loss amount of the forward propagating waves can be compensated for by an optical amplifier or the like, causing no significant problem.

Embodiment-2

Figure 22:
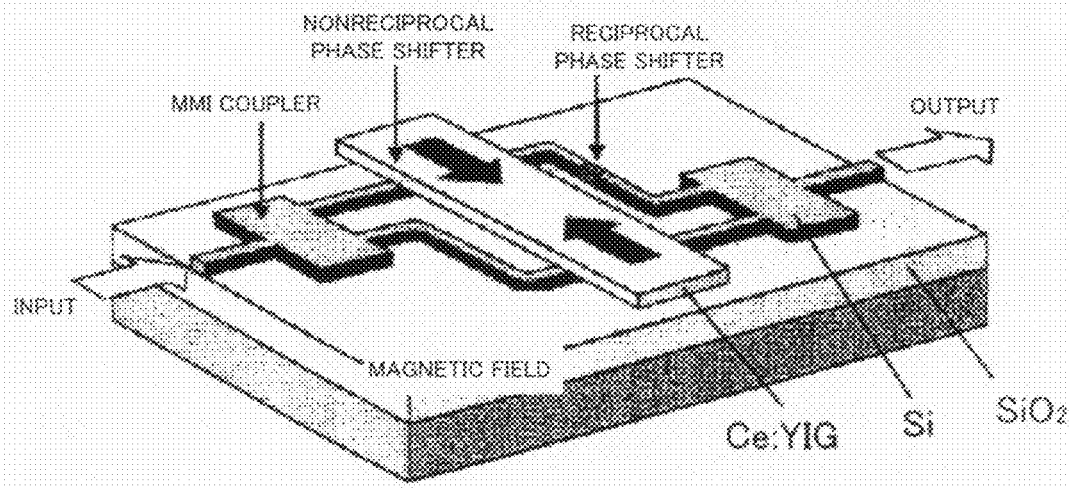
FIG. 22 is a perspective structural diagram showing an example of a waveguide-type optical isolator of which a waveguide layer is Si.

Band broadening in a waveguide-type optical isolator having a waveguide layer comprising "Si", as shown in FIG. 22, will now be described as Embodiment-2.

Figure 23:
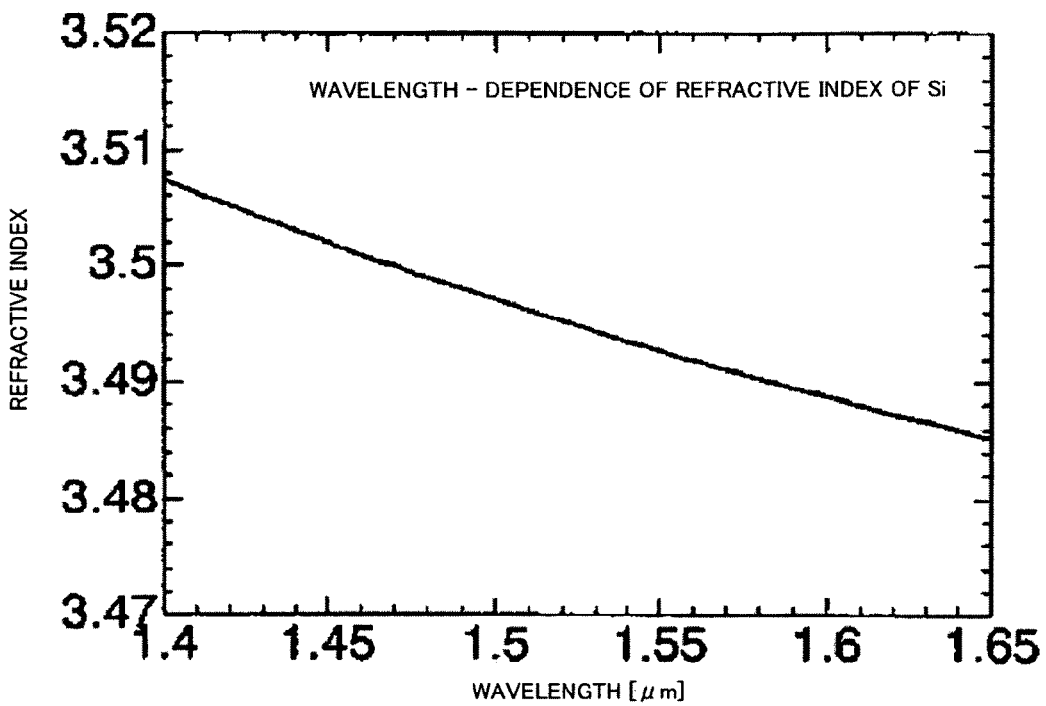
FIG. 23 is a diagram showing a characteristic example of a wavelength-dependence of a refractive index of a waveguide layer Si.

The layer structure of the present waveguide-type optical isolator is Ce:YIG (upper clad)/Si (waveguide layer)/$SiO_2$ (lower clad layer). For the wavelength-dependence of the Faraday rotation coefficient of the upper clad Ce:YIG, "Ce:YIG" having the above-described value using FIG. 11 is used, for the wavelength-dependence of the refractive index of the waveguide layer Si, "Si" having a value shown in FIG. 23 is used, and for the wavelength-dependence of the refractive index of the substrate $SiO_2$, "$SiO_2$" having a value shown in FIG. 16 is used. The present waveguide-type optical isolator is an example of an ultra-small optical isolator formed from an SOI-wafer (Si/$SiO_2$/Si), and is used as an optical isolator for use in silicon-photonics optical circuits. In FIG. 22, although a multimode interference coupling device (an MMI coupler) is used as the branching/coupling devices 4, this does not affect the band broadening of the isolator by causing phase difference wavelength-dependent flattening of the present invention. The waveguide-type optical isolator having the above structure will now be discussed.

In order to minimize the wavelength-dependence of the backward propagating waves, the reciprocal phase shifter 6 shown in FIG. 9 is formed in which $L_1$=3.30 [µm], $L_2$=4.084 [µm], $W_1$=0.8 [µm] and $W_2$=0.6 [µm] (where, "$W_1$" is the waveguide width of the reciprocal phase shifter 6, and "$W_2$" is the width of the other waveguide that does not include the reciprocal phase shifter). The thickness of the Si-waveguide layer is set to be 0.2 [µm].

Figure 24:
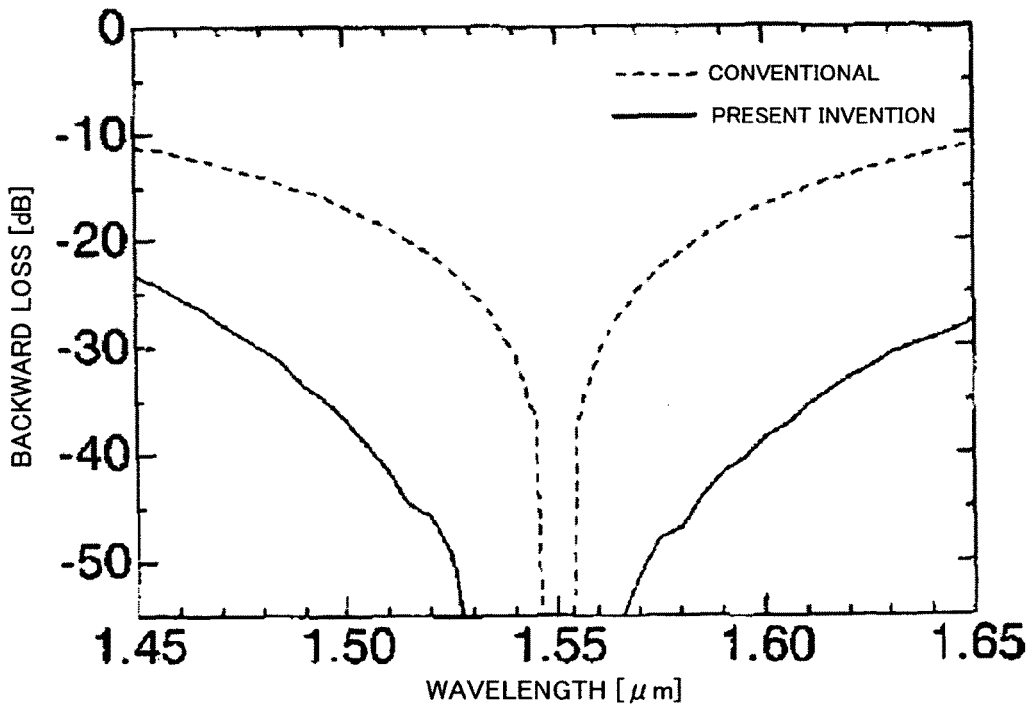
FIG. 24 is a diagram showing a characteristic example of a loss amount (backward loss amount) to a backward propagation wave.
Figure 25:
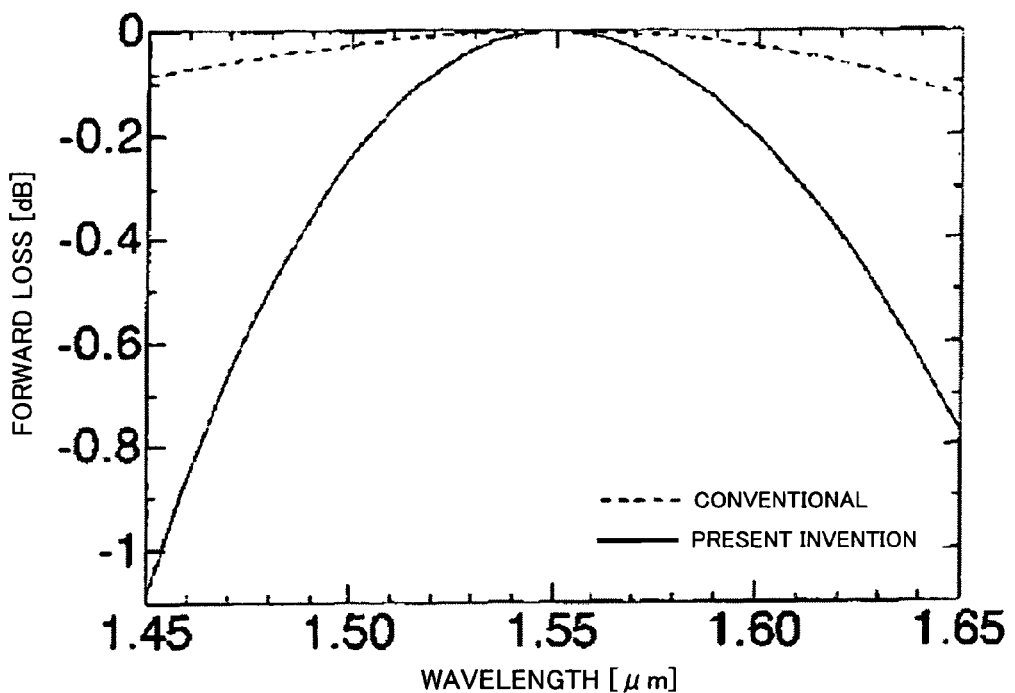
FIG. 25 is a diagram showing a characteristic example of a loss amount (forward loss amount) to a forward propagation wave.

A characteristic example of a loss amount (a diffusion amount) for the backward propagating waves of the waveguide-type optical isolator obtained by the above design is shown in FIG. 24, while a characteristic example of a loss amount (a forward loss amount) for the forward propagating waves is shown in FIG. 25.

The present waveguide-type broadband optical isolator can provide a backward loss (a diffusion amount) of 30 [dB] or more over the wavelengths in the range of 1.485 [µm] to 1.63 [µm] (in comparison, a conventional optical isolator provides a backward loss of 30 [dB] or more over the wavelengths in the range of 1.54 [µm] to 1.56 [µm]). Conversely, a conventional optical isolator has smaller wavelength-dependence for the forward propagating waves, and in the present waveguide-type broadband optical isolator it increases to approximately 0.5 [dB] at a band end (at the wavelength of 1.485 [µm]), which provides the largest insertion loss amount within the band having a backward loss (a diffusion amount) of 30 [dB] or more (in the conventional optical isolator, the insertion loss is 0.05 [dB] at the same wavelength). However, the wavelength-dependence of an isolation ratio defined by "backward loss–forward loss" is approximately determined by the wavelength-dependence of the backward loss, and as such, the present invention achieves remarkable band broadening. The insertion loss amount of the forward propagating waves can be compensated for by an optical amplifier or the like, causing no significant problem. A waveguide-type optical isolator having a waveguide layer comprising "GaInAsP" is a variation on the present waveguide-type optical isolator using the Si-waveguide layer, and is considered to have a similar effect.

Embodiment-3

Figure 26:
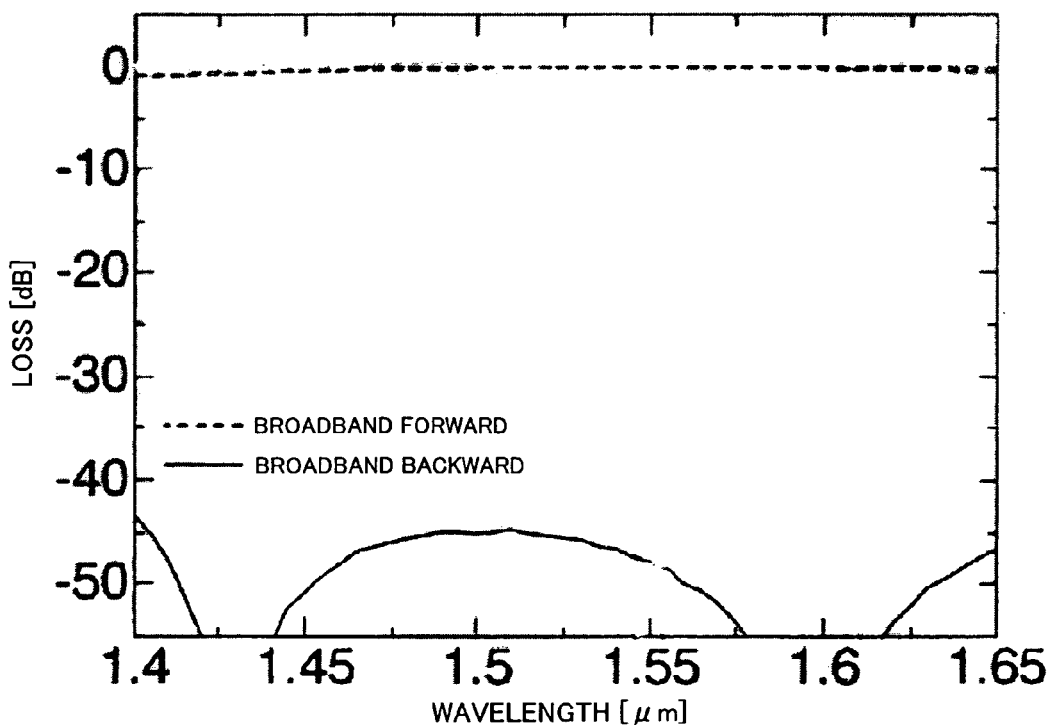
FIG. 26 is a diagram showing a characteristic example of wavelength-dependences of a backward loss (solid line) an a forward loss (broken line) for a waveguide-type broadband optical isolator of a central wavelength 1.55 μm.

A characteristic of a waveguide-type broadband optical isolator having a central wavelength of 1.55 [µm] is shown. The waveguide structure of which is shown in FIG. 14, in which $L_1$=900 [µm], $L_2$=899.55 [µm], $W_1$=2.4 [µm], $W_2$=2.0 [µm] and $L_r$=10 [µm]. The wavelength-dependence of the loss of a light wave entering the waveguide-type optical isolator obtained by the above design is shown in FIG. 26. The loss amount for the backward propagating waves is indicated by a solid line, while the loss amount for the forward propagating waves is indicated by a broken line. Over the wavelengths in the range of 1.4 [µm] to 1.65 [µm], the backward loss remarkably exceeds 30 [dB], which is a value conventionally required. As the deviation of the wavelength of incident light from 1.55 [μm] increases, the forward loss increases, but the wavelength-dependence of an isolation ratio defined by "backward loss–forward loss" is approximately determined by the wavelength-dependence of the backward loss, and as such, the present invention achieves remarkable band broadening. The insertion loss amount of the forward propagating waves can be compensated for by an optical amplifier or the like, causing no significant problem.

Embodiment-4

Figure 27:
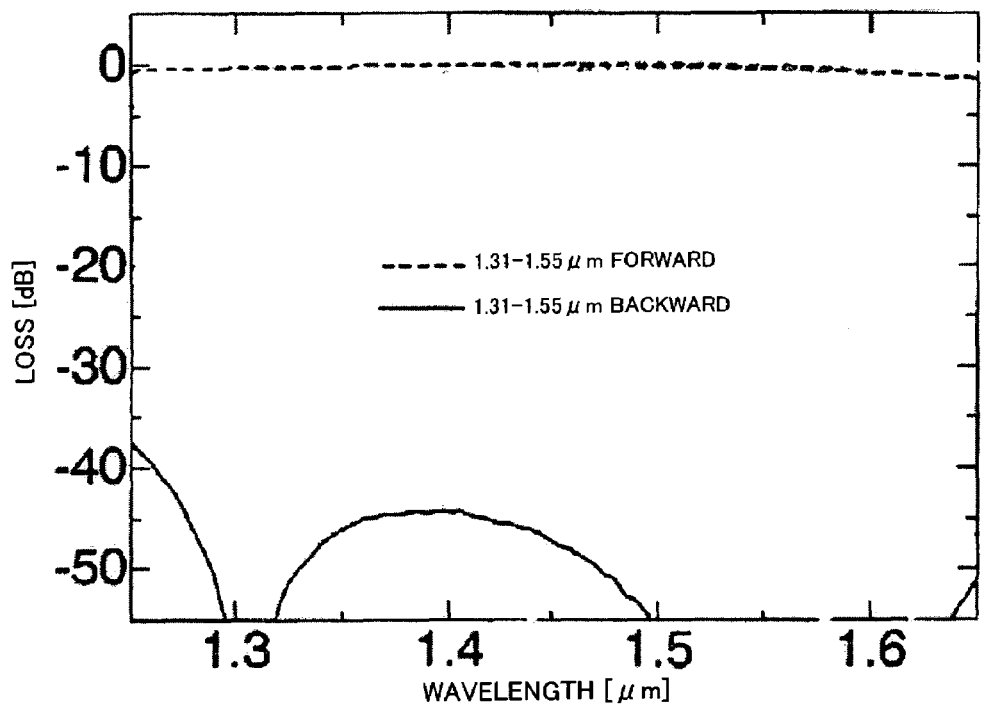
FIG. 27 is a diagram showing a characteristic example of wavelength-dependences of a backward loss (solid line) an a forward loss (broken line) for a waveguide-type broadband optical isolator of a central wavelength 1.43 μm.

A characteristic of an optical isolator having a central wavelength of 1.43 [μm] is shown. The waveguide structure of which is shown in FIG. 14, in which $L_1=930$ [μm], $L_2=9293.72$ [μm], $W_1=3.0$ [μm], $W_2=2.0$ [μm] and $L_t=10$ [μm]. The wavelength-dependence of the loss of a light wave entering the waveguide optical isolator obtained by the above design is shown in FIG. 27. The loss amount for the backward propagating waves is indicated by a solid line, while the loss amount for the forward propagating waves is indicated by a broken line. The range in which the backward loss exceeds 30 [dB], which is a value conventionally required, covers two wavelengths of a 1.31-μm band (1.26 to 1.36 [μm]) and a 1.55-μm band (1.53 to 1.625 [μm]). As the deviation of the wavelength of incident light from 1.43 [μm] increases, the forward loss increases, but the wavelength-dependence of an isolation ratio defined by "backward loss–forward loss" is approximately determined by the wavelength-dependence of the backward loss, and as such, the present invention achieves remarkable band broadening. The insertion loss amount of the forward propagating waves can be compensated for by an optical amplifier or the like, causing no significant problems.

As described above, the waveguide-type broadband optical isolator of the present invention can provide an operating band of 200 [nm] or more, in contrast to a conventional waveguide-type optical isolator which has a designed wavelength 1.55 [μm] and provides an operating band having a diffusion amount of backward propagating waves (backward loss) of 30 [dB] or more over approximately 20 [nm] (approximately 1.54 [μm] to 1.56 [μm]), thereby to straddle the designed wavelength.

In the waveguide structure of the present invention, the waveguide length is changed to provide a reciprocal phase difference $3\pi/2$, and the direction of the magnetic field applications for providing a nonreciprocal phase difference are set to be aligned, thereby to provide the forward propagating waves with a phase difference $2\pi$ and providing the backward propagating waves with a phase difference $\pi$.

Furthermore, by partially changing the width of the waveguide of the reciprocal phase shifter, by changing the length of the waveguide, or by changing the width of the waveguide and the length of the waveguide, the wavelength-dependence of the phase shift by the reciprocal phase shifter is cancelled out by the wavelength-dependence of the nonreciprocal phase shifter, thereby to achieve a reduction of wavelength-dependence for the backward propagating waves.

In addition, reflection and radiation of a propagating light caused by changing the waveguide width can be reduced by introduction of a tapered waveguide.

In optical isolators, a backward loss (a diffusion amount) is frequently required to be increased even at the expense of a forward loss, and band broadening can be achieved by canceling the mutual wavelength-dependence.

The invention claimed is:

1. A waveguide type broadband optical isolator, comprising:
a reciprocal phase shifter which makes a phase difference of $3\pi/2$ between a first light wave propagating through a first waveguide and a second light wave propagating through a second waveguide, with a fundamental operating wavelength $\lambda$; and a nonreciprocal phase shifter which provides a phase difference of $\pi/2$ for forward propagating waves and a phase difference of $-\pi/2$ for backward propagating waves;

wherein:

said reciprocal phase shifter includes a tapered waveguide in a propagation direction of a light wave and also includes a tapered waveguide in a part of the other one of said first and second waveguides;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + \tfrac{3}{4}) \times 2\pi$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

2. A waveguide type broadband optical isolator, comprising:
a reciprocal phase shifter which makes a phase difference of $(x + \tfrac{3}{4}) \times 2\beta$ between a first light wave propagating through a first waveguide and a second light wave propagating through a second waveguide, with "x" being an integer of zero or more in a fundamental operating wavelength $\lambda$; and a nonreciprocal phase shifter which provides a phase difference of $\pi/2$ for forward propagating waves and a phase difference of $-\pi/2$ for backward propagating waves, wherein:

said reciprocal phase shifter includes a tapered waveguide in a propagation direction of a light wave and also includes a tapered waveguide in a part of the other one of said first and second waveguides;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + \tfrac{3}{4}) \times 2\pi$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

3. A waveguide-type broadband optical isolator, comprising:
a reciprocal phase shifter which makes a phase difference of $3\pi/2$ between a first light wave propagating through a first waveguide and a second light wave propagating through a second waveguide, with a fundamental operating wavelength $\lambda$; and a nonreciprocal phase shifter which provides a phase difference of π/2 for forward propagating waves and a phase difference of −π/2 for backward propagating waves, wherein:

said reciprocal phase shifter has a predetermined waveguide width which is not less than a waveguide width of said first waveguide or said second waveguide, and has a waveguide effective refractive index changed;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

4. A waveguide-type broadband optical isolator, comprising:

a reciprocal phase shifter which makes a phase difference of (x + 3/4) ×2π between a first light wave propagating through a first waveguide and a second light wave propagating through a second waveguide, with "x" being an integer of zero or more in a fundamental operating wavelength λ; and a nonreciprocal phase shifter which provides a phase difference of π/2 for forward propagating waves and a phase difference of −π/2 for backward propagating waves, wherein:

said reciprocal phase shifter has a predetermined waveguide width which is not less than a waveguide width of said first waveguide or said second waveguide, and has a waveguide effective refractive index changed;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

5. A waveguide-type broadband optical isolator, comprising:

a reciprocal phase shifter which makes a phase difference of 3π/2 between a first light wave propagating through a first waveguide and a second light wave propagating through a second waveguide, with a fundamental operating wavelength λ; and a nonreciprocal phase shifter which provides a phase difference of π/2 for forward propagating waves and a phase difference of −π/2 for backward propagating waves;

wherein:

directions of magnetic field applications to a magneto-optical material of said nonreciprocal phase shifter are opposite;

said reciprocal phase shifter has a predetermined waveguide width which is not less than a waveguide width of said first waveguide or said second waveguide, and has a waveguide effective refractive index changed;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

6. A waveguide type broadband optical isolator, comprising:

a reciprocal phase shifter which makes a phase difference of (x + 3/4) ×2π between a first light wave propagating through a first waveguide and a second light wave propagating through a second waveguide, with "x" being an integer of zero or more in a fundamental operating wavelength λ; and a nonreciprocal phase shifter which provides a phase difference of π/2 for forward propagating waves and a phase difference of −π/2 for backward propagating waves, wherein:

directions of magnetic field applications to a magneto-optical material of said nonreciprocal phase shifter are opposite;

said reciprocal phase shifter has a predetermined waveguide width which is not less than a waveguide width of said first waveguide or said second waveguide, and has a waveguide effective refractive index changed;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

7. A waveguide type broadband optical isolator, comprising:

a reciprocal phase shifter which makes a phase difference of 3π/2 between a first light wave propagating through a first waveguide and a second light wave propagating through a second waveguide, with a fundamental operating wavelength λ; and a nonreciprocal phase shifter which provides a phase difference of π/2 for forward propagating waves and a phase difference of −π/2 for backward propagating waves;

wherein:

directions of magnetic field applications to a magneto-optical material of said nonreciprocal phase shifter are opposite;

said reciprocal phase shifter includes a tapered waveguide in a propagation direction of a light wave and also includes a tapered waveguide in a part of the other one of said first and second waveguides;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_1 - \beta_2 \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

8. A waveguide-type broadband optical isolator, comprising:

a reciprocal phase shifter which makes a phase difference of $(x + 3/4) \times 2\pi$ between a first light wave propagating through a first waveguide and a second light wave propagating through a second waveguide, with "x" being an integer of zero or more in a fundamental operating wavelength $\lambda$; and a nonreciprocal phase shifter which provides a phase difference of $\pi/2$ for forward propagating waves and a phase difference of $-\pi/2$ for backward propagating waves, wherein:

directions of magnetic field applications to a magneto-optical material of said nonreciprocal phase shifter are opposite;

said reciprocal phase shifter includes a tapered waveguide in a propagation direction of a light wave and also includes a tapered waveguide in part of the other one of said first and second waveguides;

said first waveguide includes said reciprocal phase shifter;

said second waveguide has an adjustment section for adjusting a phase shift by said reciprocal phase shifter; and said adjustment section has an optical path length $L_2$ and a waveguide propagation constant $\beta_2$ satisfying a formula $$\beta_1 \times L_{1-\beta 2} \times L_2 = (x + 3/4) \times 2\pi,$$

wherein "$L_0$" is an optical path length between branching/coupling devices of said first waveguide which does not include said reciprocal phase shifter, "$\beta_2$" is a propagation constant, "$L_1$" is an optical path length of said reciprocal phase shifter, "$\beta_1$" is a propagation constant, and "x" is an integer of zero or more.

* * * * *